US011332662B2

(12) United States Patent
Tang et al.

(10) Patent No.: US 11,332,662 B2
(45) Date of Patent: May 17, 2022

(54) CHIRAL COMPOUND FOR INDUCTION OF CIRCULARLY POLARIZED LUMINESCENCE FROM ACHIRAL LUMINOGENS

(71) Applicant: THE HONG KONG UNIVERSITY OF SCIENCE AND TECHNOLOGY, Hong Kong (CN)

(72) Inventors: Benzhong Tang, Hong Kong (CN); Jing Zhang, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 345 days.

(21) Appl. No.: 16/591,235

(22) Filed: Oct. 2, 2019

(65) Prior Publication Data
US 2020/0123441 A1 Apr. 23, 2020

Related U.S. Application Data

(60) Provisional application No. 62/766,178, filed on Oct. 5, 2018.

(51) Int. Cl.
*C09K 11/06* (2006.01)

(52) U.S. Cl.
CPC ...... *C09K 11/06* (2013.01); *C09K 2211/1007* (2013.01); *C09K 2211/1011* (2013.01); *C09K 2211/1014* (2013.01); *C09K 2211/1048* (2013.01)

(58) Field of Classification Search
None
See application file for complete search history.

(56) References Cited

U.S. PATENT DOCUMENTS

2019/0177613 A1* 6/2019 Yu .................... C09K 11/06

OTHER PUBLICATIONS

Li, N. J. Mater. Chem. C. 2015, 3, 11458.*
Liang, J. J. Chem. Mater. Chem. C, 2014, 2, 2243.*

* cited by examiner

*Primary Examiner* — Clinton A Brooks
(74) *Attorney, Agent, or Firm* — Nath, Goldberg & Meyer; Joshua B. Goldberg

(57) ABSTRACT

The present subject matter relates to a fluorescent compound having aggregation-induced emission (AIE) characteristics. The compound can undergo spontaneous hierarchical self-assembly from a vesicle to a helical fiber in the aggregate state. A composition capable of providing circularly polarized luminescence can include the fluorescent compound and at least one additional compound selected from the group consisting of an aggregation-caused quenching luminogen and an aggregation-induced emission luminogen.

16 Claims, 22 Drawing Sheets

CHIRAL COMPOUND FOR INDUCTION OF CIRCULARLY POLARIZED LUMINESCENCE FROM ACHIRAL LUMINOGENS

CROSS-REFERENCE

The present application claims priority to provisional U.S. Patent Application No. 62/766,178, filed Oct. 5, 2018, which was filed by the inventors hereof and is incorporated herein by reference in its entirety.

FIELD

The present subject matter relates generally to a fluorescent compound with aggregation-induced emission characteristics, and particularly, a fluorescent compound that undergoes spontaneous hierarchical self-assembly from a vesicle to a helical fiber in the aggregate state.

BACKGROUND

Development of organic systems having circularly polarized luminescence has gained increasing importance in various fields, including stereoscopic optical information storage and processing, optical recognition sensors, quantum computing, and circularly polarized electroluminescence for 3D displays. The circularly polarized luminescence (CPL) response of a molecular system is quantified by the dissymmetry factor ($g_{lum}$). Herein, $g_{lum}=2(I_L-I_R)/(I_L+I_R)$, where $I_L$ and $I_R$ denote the emission intensities of left and right circularly polarized luminescence, respectively. Generally, the $|g_{lum}|$ value of most reported organic systems in the solution state is around $10^{-3}$.

The general strategy for achieving CPL has been to build molecules with a specific chiral configuration that are characterized by fluorescent, delayed fluorescent, or phosphorescent optical properties. Many of these molecules, however, exhibit low dissymmetric factors. One of the recent strategies adopted for the improvement in luminescence dissymmetry of organic systems is through hierarchical self-assembly of CPL systems.

Hierarchical self-assembly is ubiquitous in nature and is one of the most sophisticated bottom-up approaches used by living organisms to construct desirable architectures using molecular building blocks. One typical example is the tendon, which is constructed of six hierarchies, starting from primary triple helices of tropocollagen and then developing into microfibrils, subfibrils, fibrils, fascicles, and, ultimately, tendons. Compared with the nonhierarchical self-assembled systems, biological systems with structural integrity originating from hierarchical self-assemblies are far superior. They exhibit higher stability against environmental changes (e.g. pH, temperature, and pressure) and much greater strength against external stimuli (e.g. mechanical, electric, or magnetic forces). Because of these advantages, the strategy of hierarchical self-assembly has also been widely used to accomplish the construction of functional materials at a nanoscale and microscale that have applications in various fields ranging from optoelectronic materials to biomedicine. Therefore, in-depth exploration of the hierarchical self-assembly processes and the underlying mechanism are vital to mimic or even surpass nature's designs and meet real-life applications.

Chirality, as an important biochemical symbol of life, is omnipresent in nature and plays a crucial role in the hierarchical construction of living systems. Helicity, as the central structural motif in living hierarchical systems, is a consequence of hierarchical self-assembly constructed from chiral subunits such as amino acids. Through a hierarchical self-assembly approach, natural systems are able to express and amplify molecular chirality into preferred supramolecular helicity (e.g., secondary alpha-helix structures of peptides and proteins) so as to perform various physiological functions. The precisely controllable scale and chirality sign are of great importance since they are closely related to diverse physiological functions in nature (e.g., recognition, catalytic activity, gene replication and expression). Therefore, insight into the underlying mechanisms of the hierarchical assemblies is a fundamental and important issue not only in modern biology but in material science and nanotechnology as well.

Nevertheless, it has been a paramount challenge to thoroughly decipher the hierarchical self-assembly process due to the complexity involved. Advanced microscopy technologies, including scanning force microscopy (SFM), scanning electron microscope (SEM), atomic force microscopy (AFM), transmission electron microscopy (TEM), etc., can reveal a transitory morphology of the self-assembled morphologies at a specific stage of the self-assembly, but cannot reveal the whole assembly process.

It has been well-established that optical spectrometry is a powerful technique on account of the extreme sensitivity of the π-conjugated chromophore to conformational, orientational, and supramolecular states. Circular dichroism (CD) signals originate from the electronic transitions of the chromophore and are highly sensitive to the molecular conformations as well as the molecular aggregation. Therefore, CD spectrometry has been employed as one of the most important techniques for probing chirality variations in nanoassemblies and molecular, biological macromolecular, and supramolecular systems. Supramolecular helical systems generated from hierarchical assemblies are fully adaptable to the outstanding sensitivity of the CD method because chirality is usually significantly amplified in the progress of helical growth, which in turn facilitates CD detection.

Accordingly, AIEgens that can undergo spontaneous hierarchical self-assembly from a vesicle to a helical fiber in the aggregate state are highly desirable.

SUMMARY

The present subject matter relates to a fluorescent compound having aggregation-induced emission (AIE) characteristics. The compound can undergo spontaneous hierarchical self-assembly from a vesicle to a helical fiber in the aggregate state. The hierarchical self-assembly process can be monitored using at least one of circular dichroism spectroscopy, scanning electron microscopy, and transmission electron microscopy.

In an embodiment, the compound includes the following structural formula:

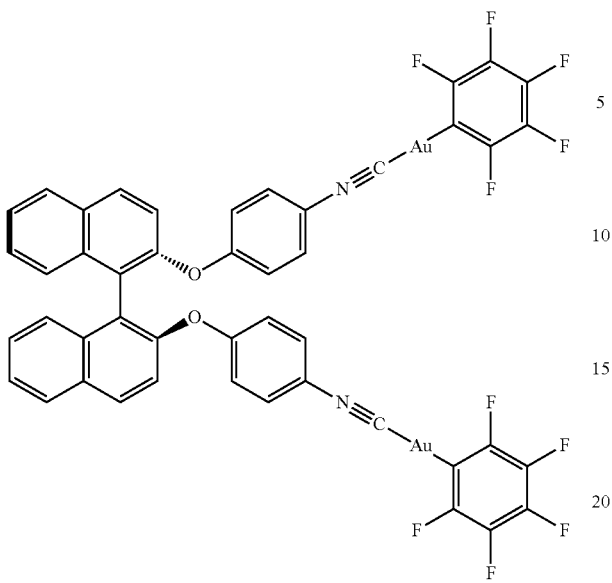

or an enantiomer thereof.

In an embodiment, the enantiomer includes

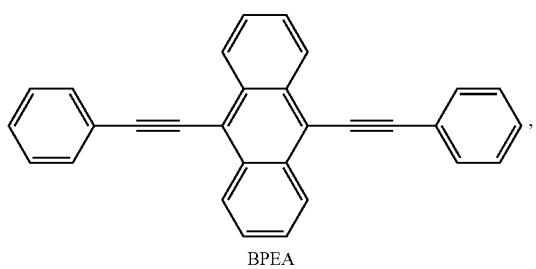

BPEA

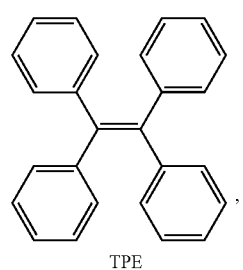

TPE

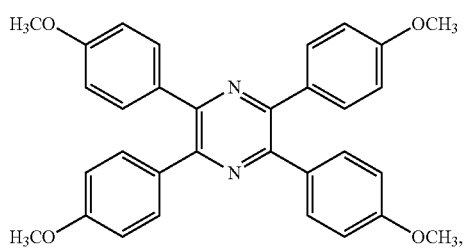

TPP-4M and

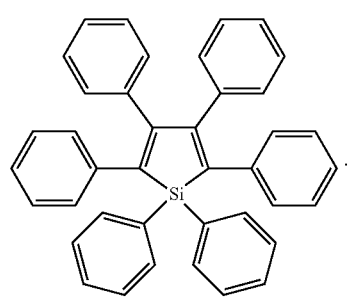

HPS

An embodiment of the present subject matter relates to a composition capable of providing circularly polarized luminescence. The composition can include the fluorescent compound and at least one compound selected from the group consisting of an aggregation-caused quenching luminogen and an aggregation-induced emission luminogen.

In an embodiment the composition includes the fluorescent compound and at least one compound selected from In an embodiment, a method of synthesizing a composition capable of providing circularly polarized luminescence includes: providing a fluorescent compound exhibiting aggregation induced emission properties, the compound having the following structural formula

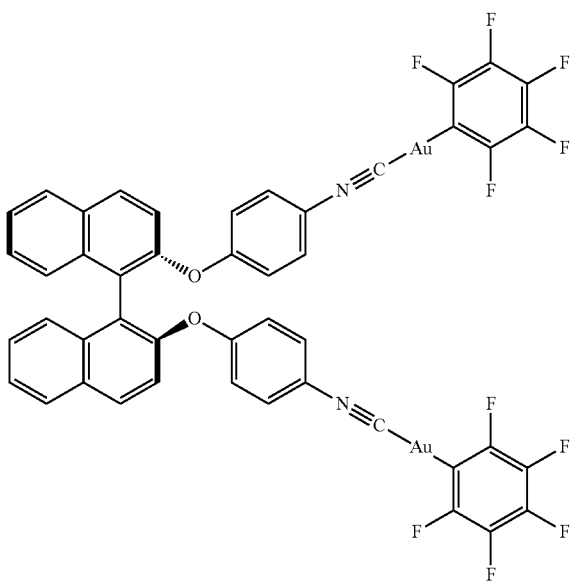

or an enantiomer thereof; and co-assembling the fluorescent compound with at least one other compound, the at least one other compound being selected from the group consisting of an aggregation-caused quenching luminogen and an aggregation-induced emission luminogen.

BRIEF DESCRIPTION OF DRAWINGS

Various embodiments will now be described in detail with reference to the accompanying drawings.

DETAILED DESCRIPTION

Figure 1:
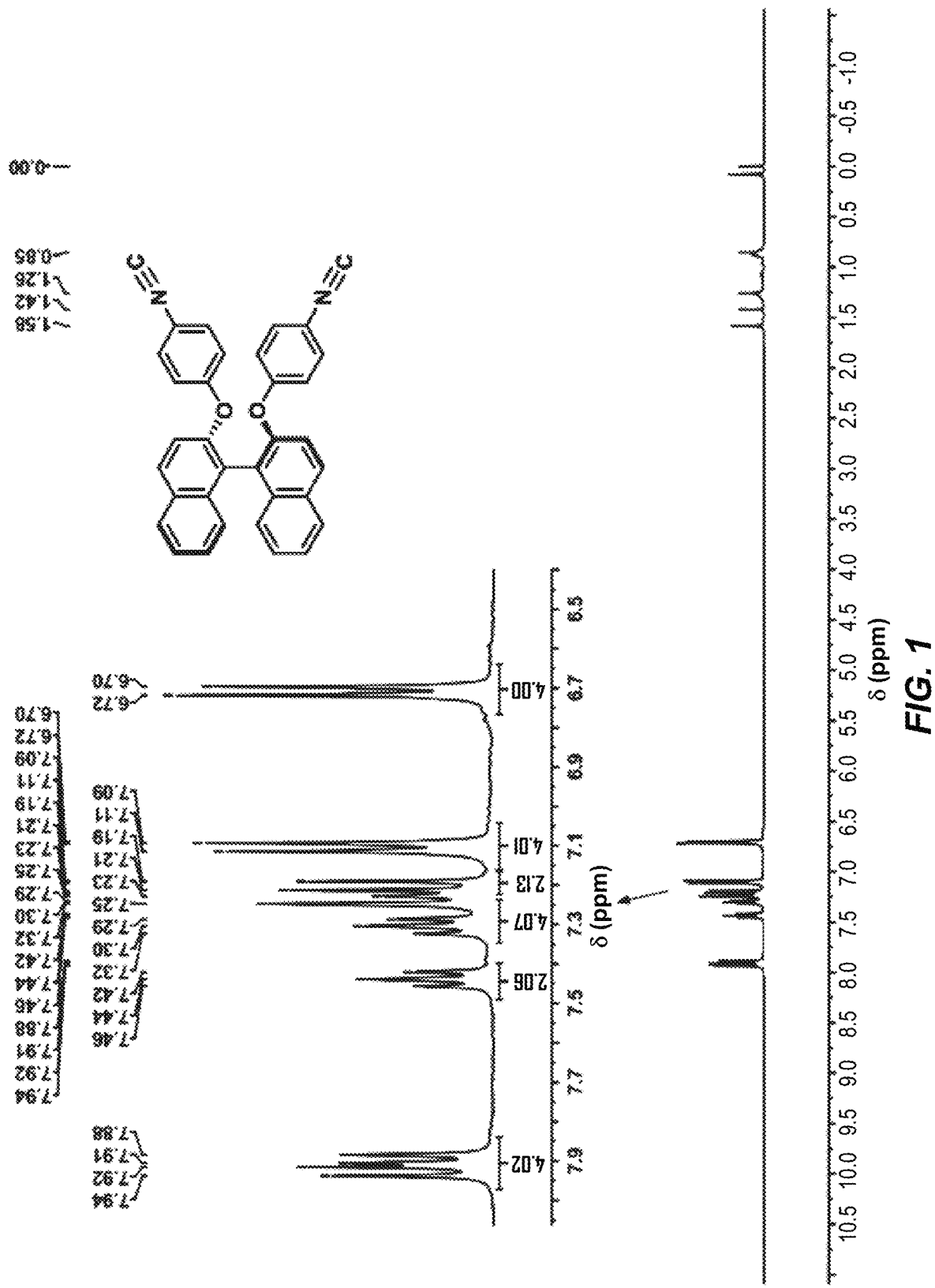
FIG. 1 depicts $^1$H NMR spectrum of (S)-4 in CDCl$_3$.
Figure 2:
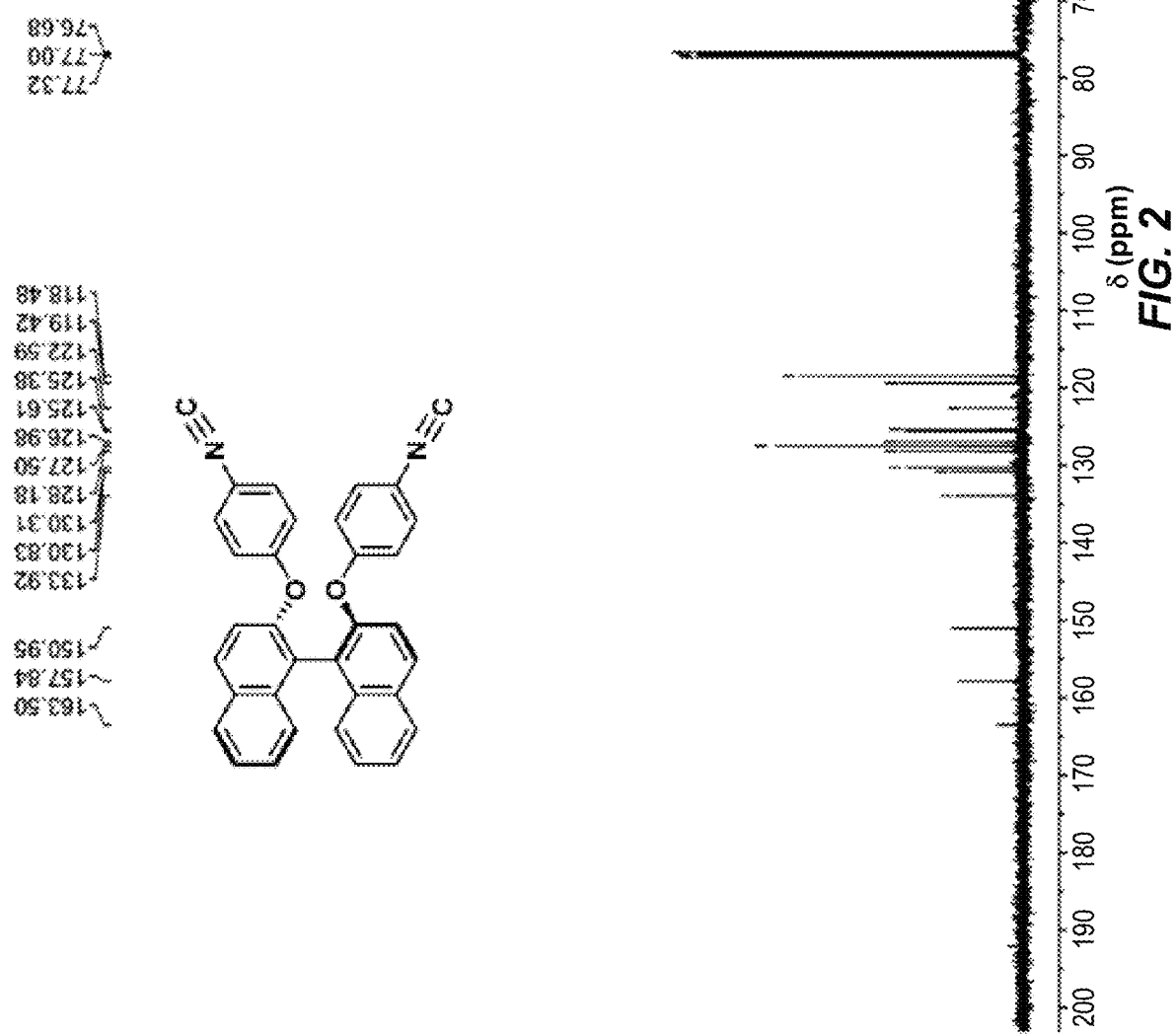
FIG. 2 depicts $^{13}$C NMR spectrum of (S)-4 in CDCl$_3$.
Figure 3:
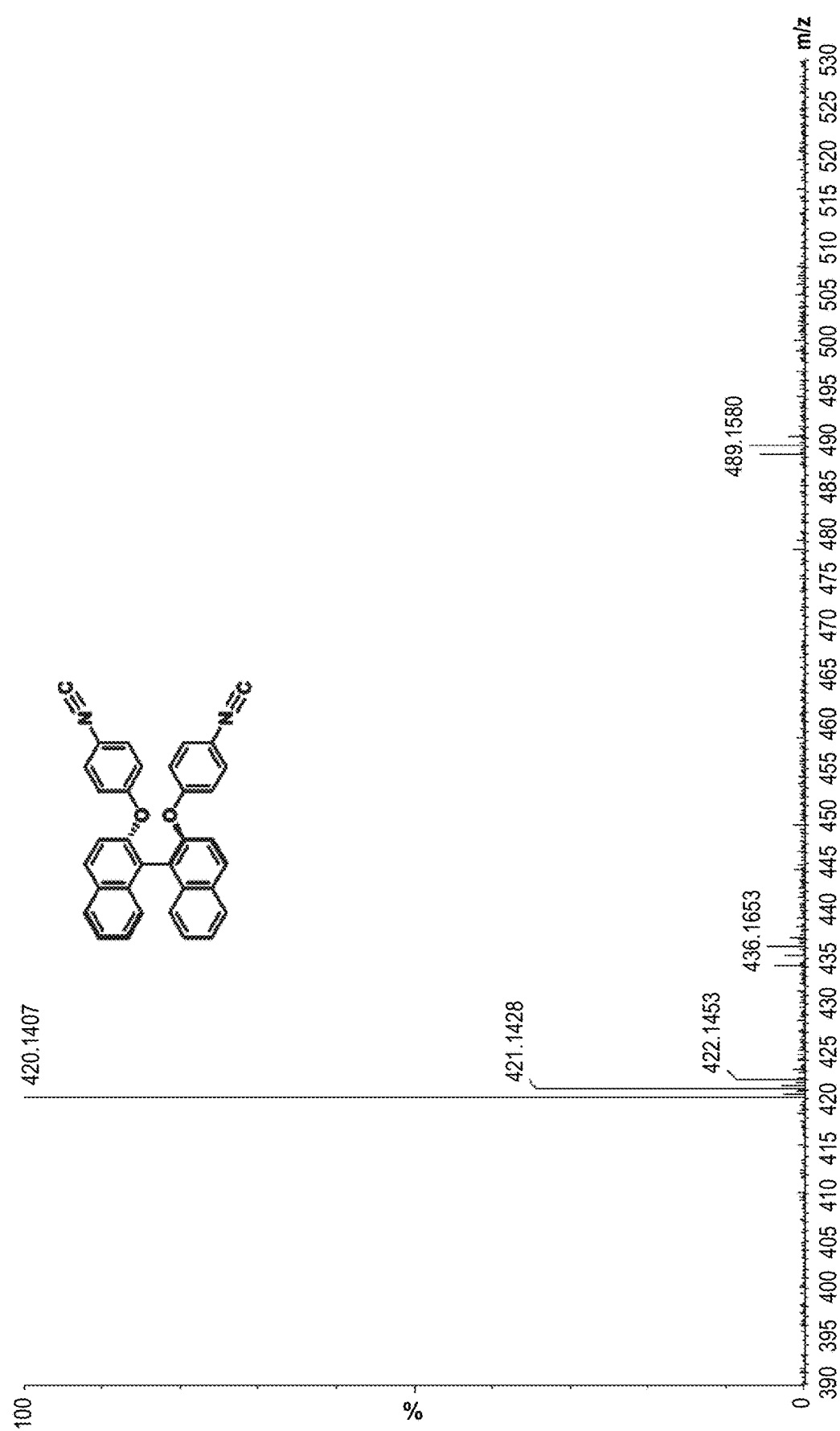
FIG. 3 depicts HR-MS spectrum of (S)-4.
Figure 4:
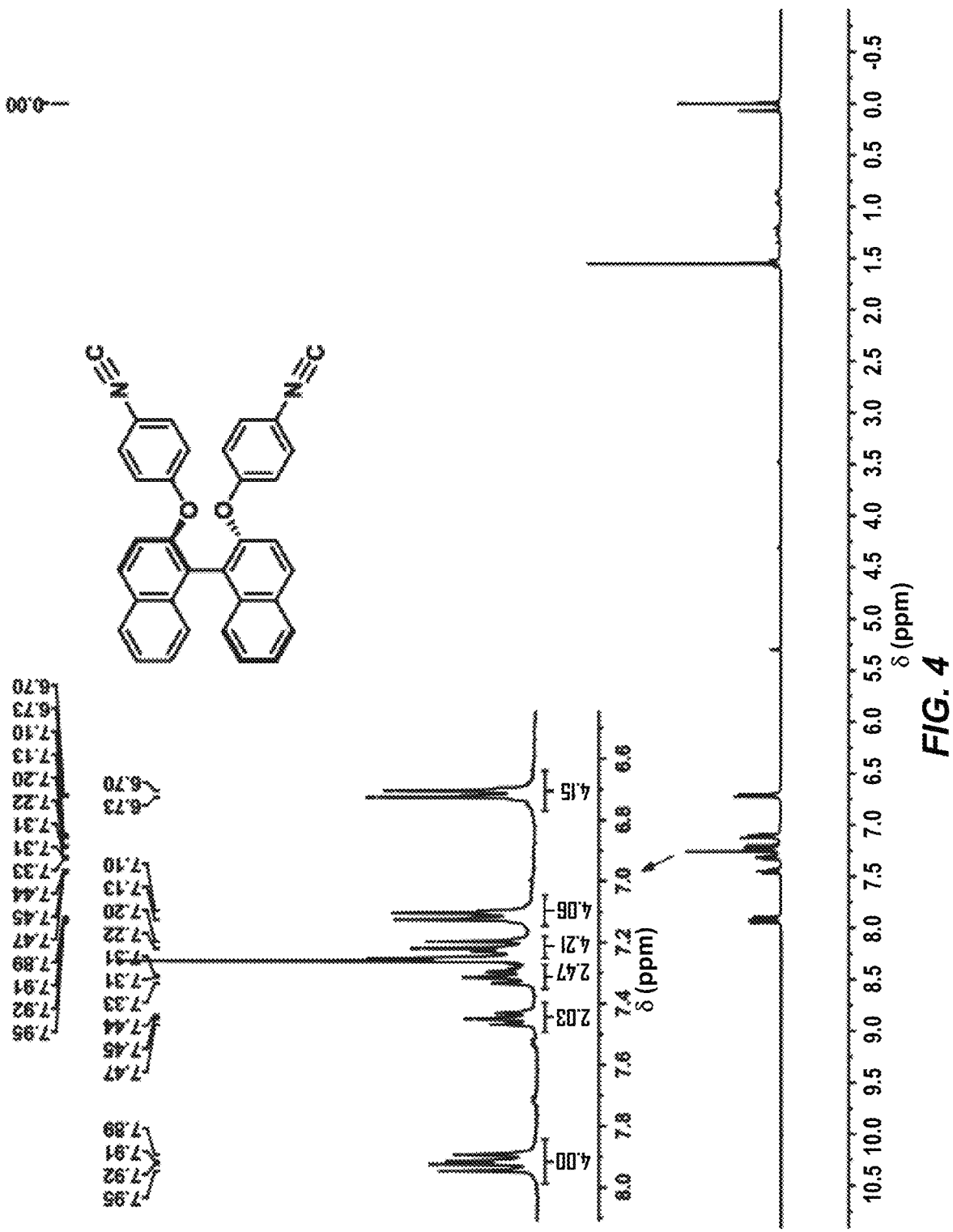
FIG. 4 depicts $^1$H NMR spectrum of (R)-4 in CDCl$_3$.
Figure 5:
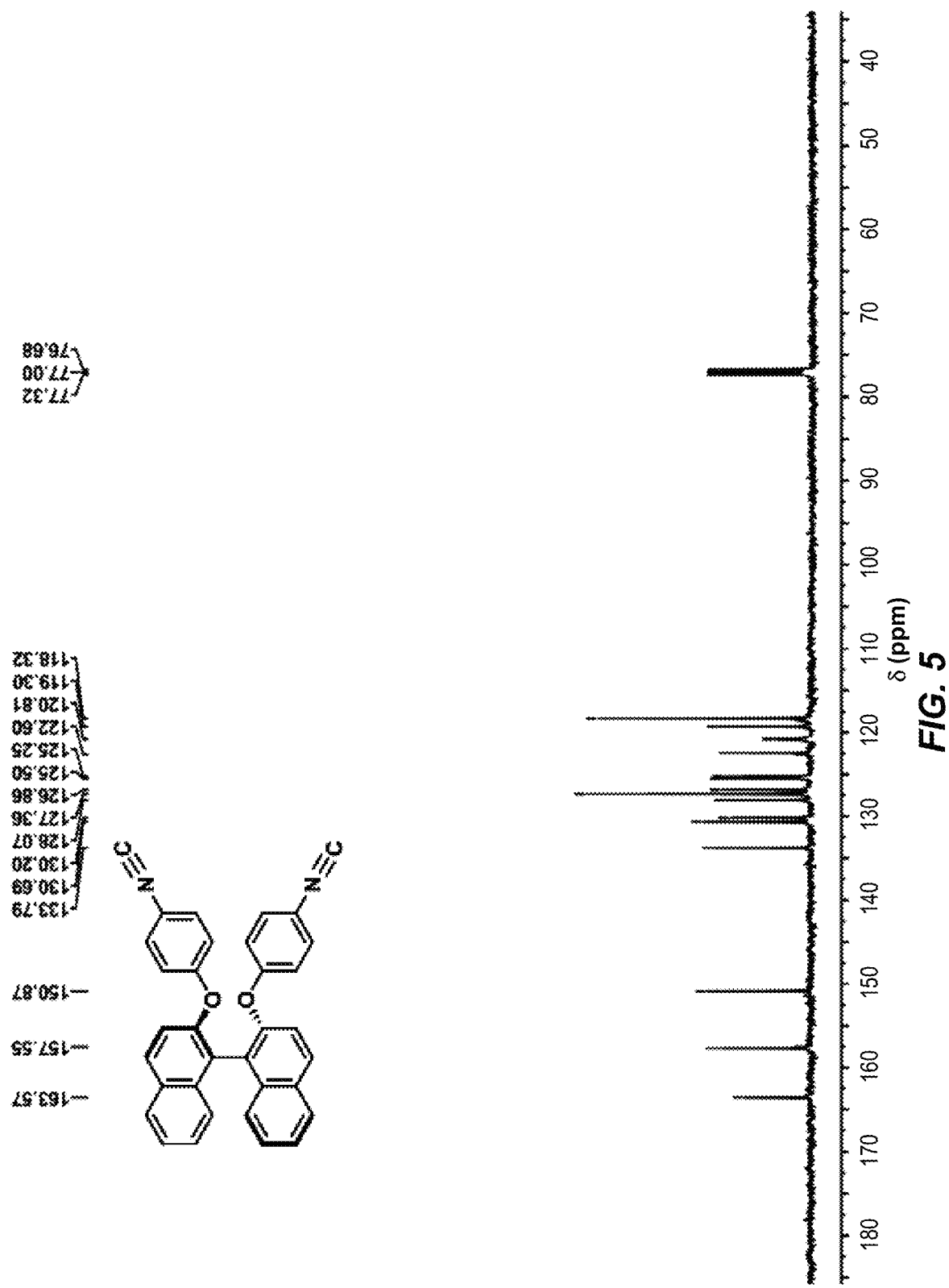
FIG. 5 depicts $^{13}$C NMR spectrum of (R)-4 in CDCl$_3$.
Figure 6:
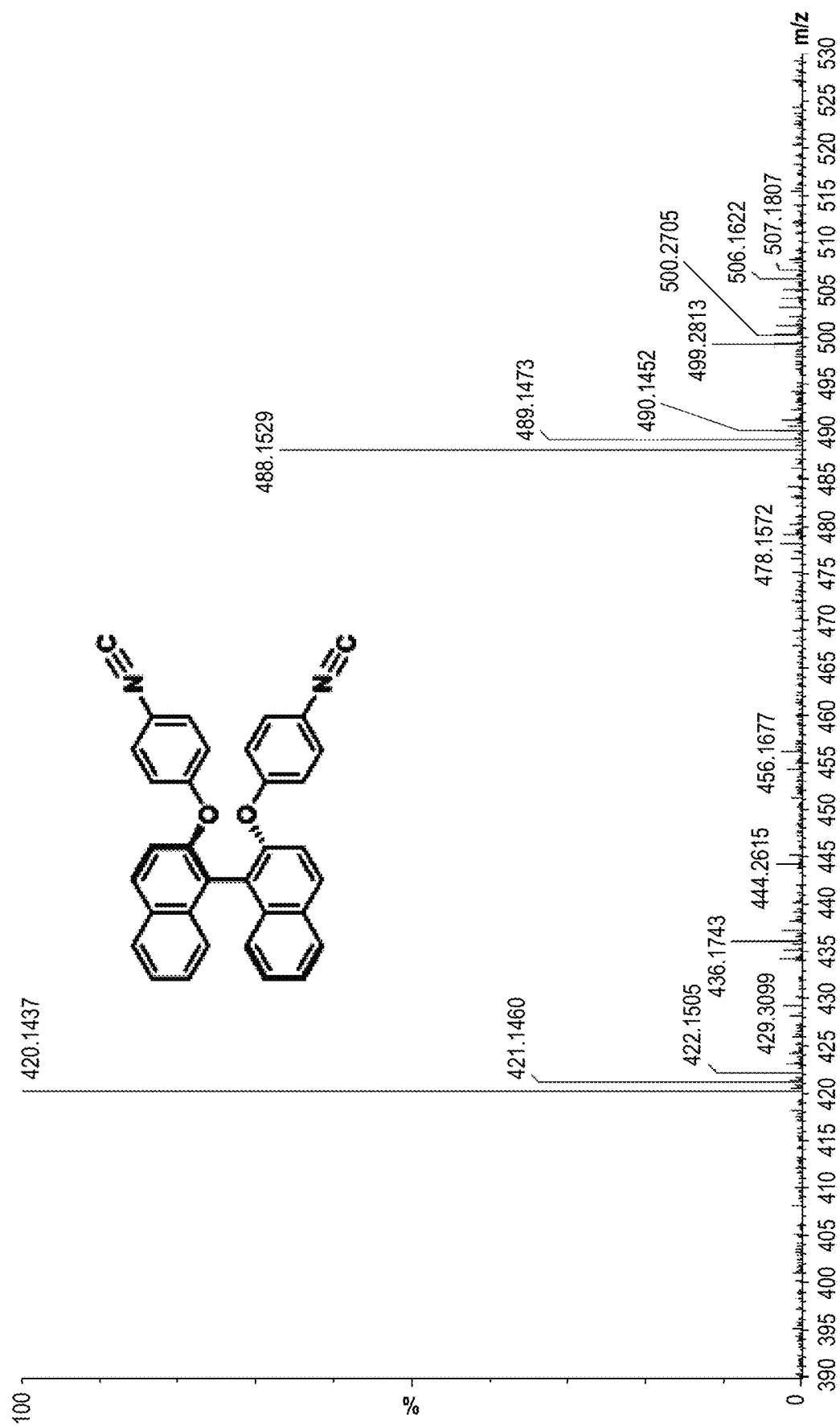
FIG. 6 depicts HR-MS spectrum of (R)-4.
Figure 7:
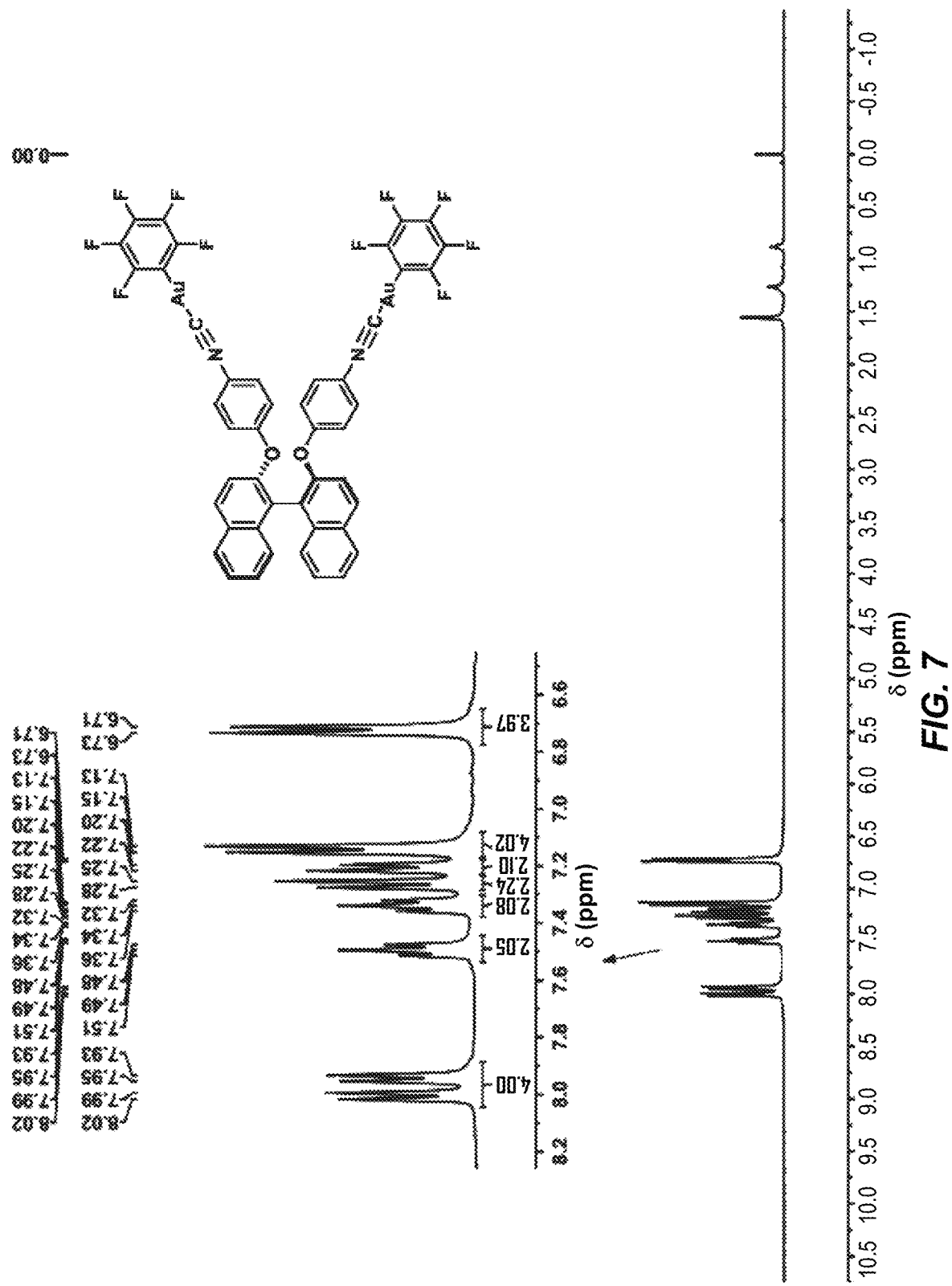
FIG. 7 depicts $^1$H NMR spectrum of (S)-1 in CDCl$_3$.
Figure 8:
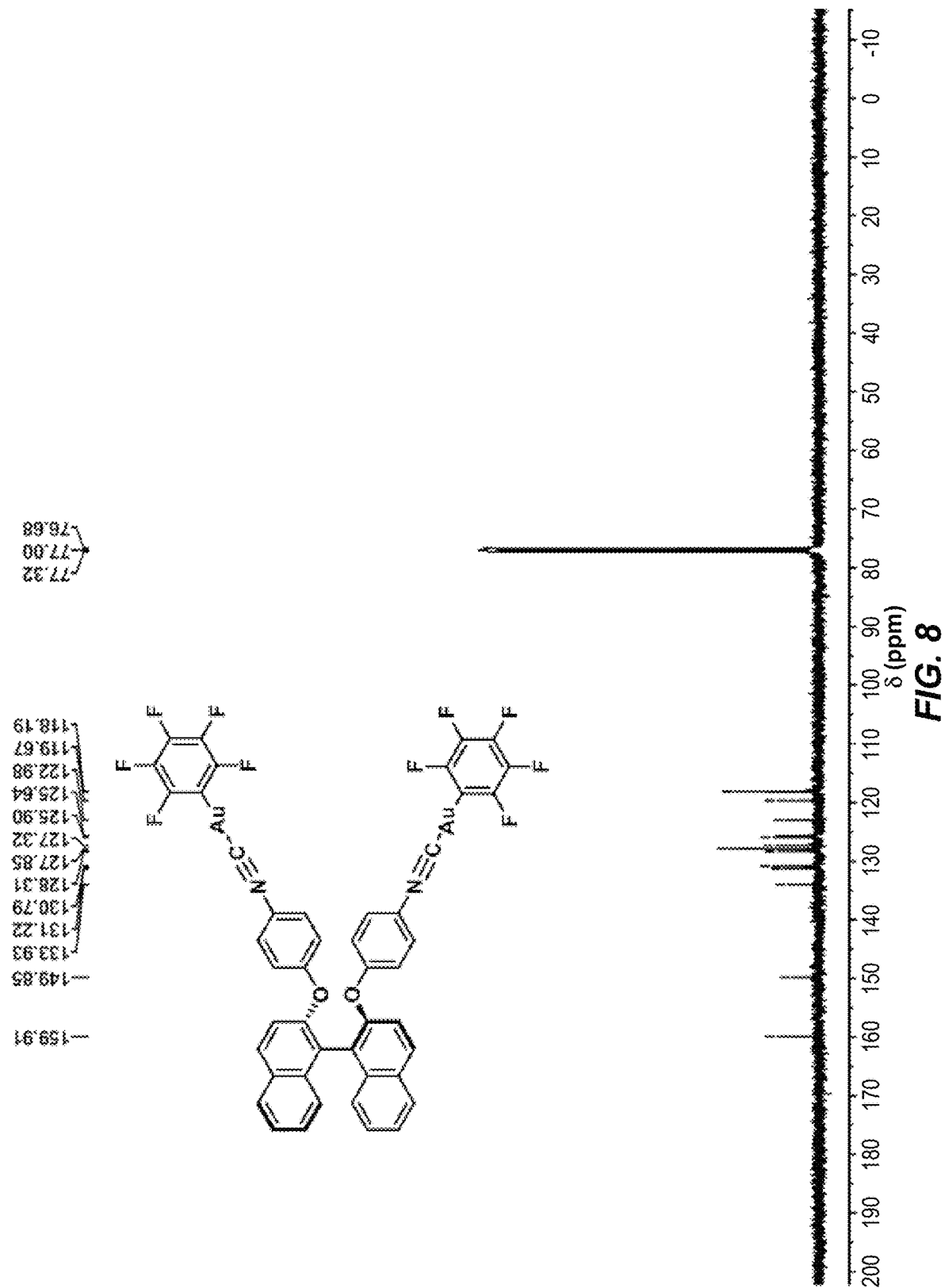
FIG. 8 depicts $^{13}$C NMR spectrum of (S)-1 in CDCl$_3$.
Figure 9:
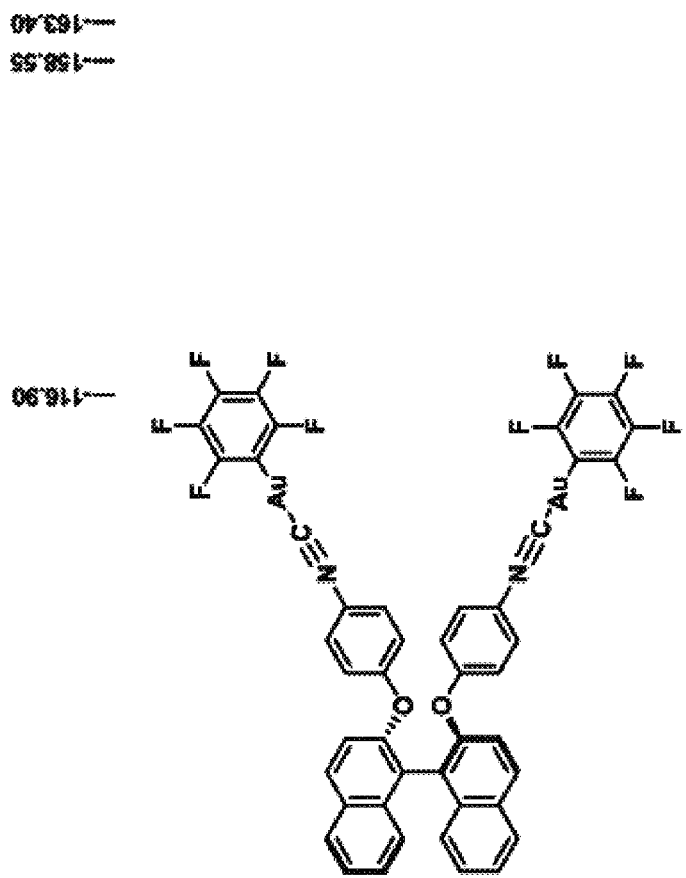
FIG. 9 depicts $^{19}$F NMR spectrum of (S)-1 in CDCl$_3$.
Figure 9:
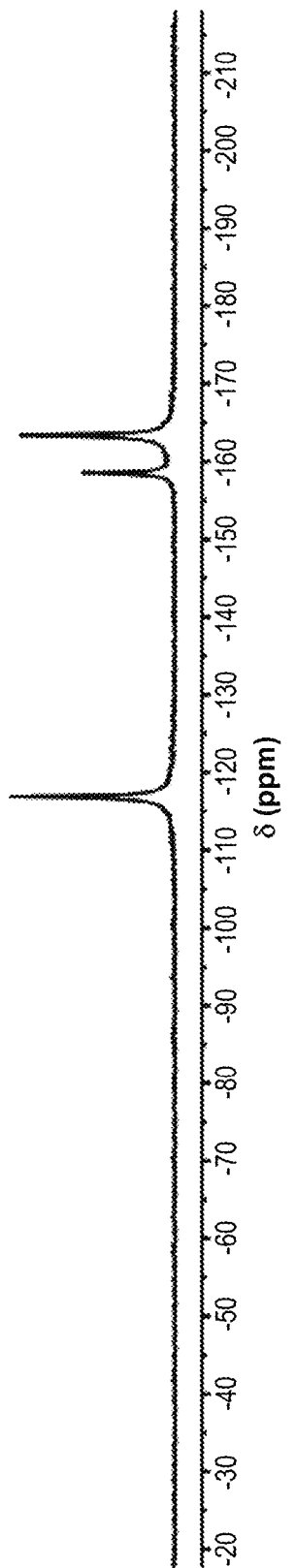
Figure 10:
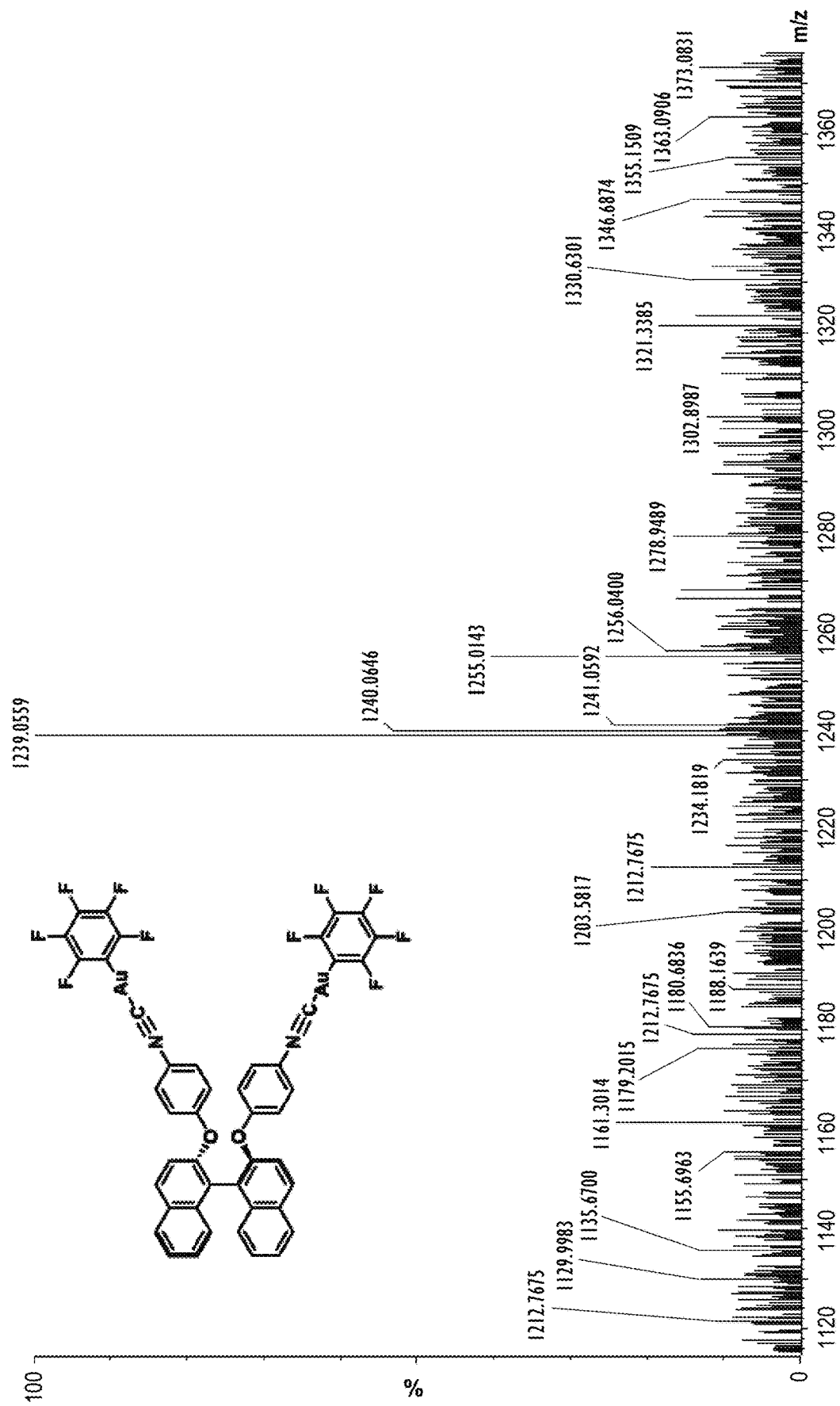
FIG. 10 depicts HR-MS spectrum of (S)-1.
Figure 11:
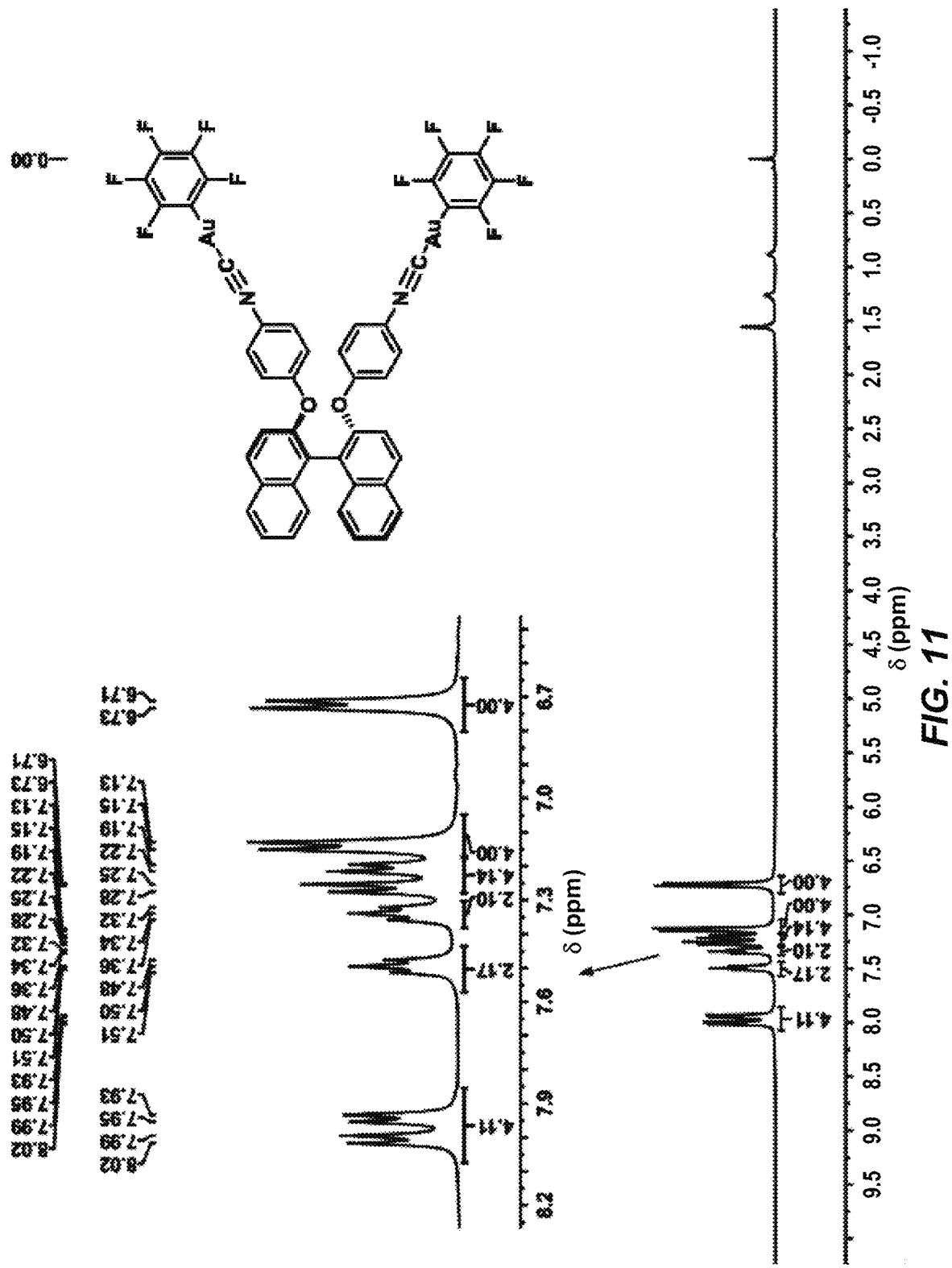
FIG. 11 depicts $^1$H NMR spectrum of (R)-1 in CDCl$_3$.
Figure 12:
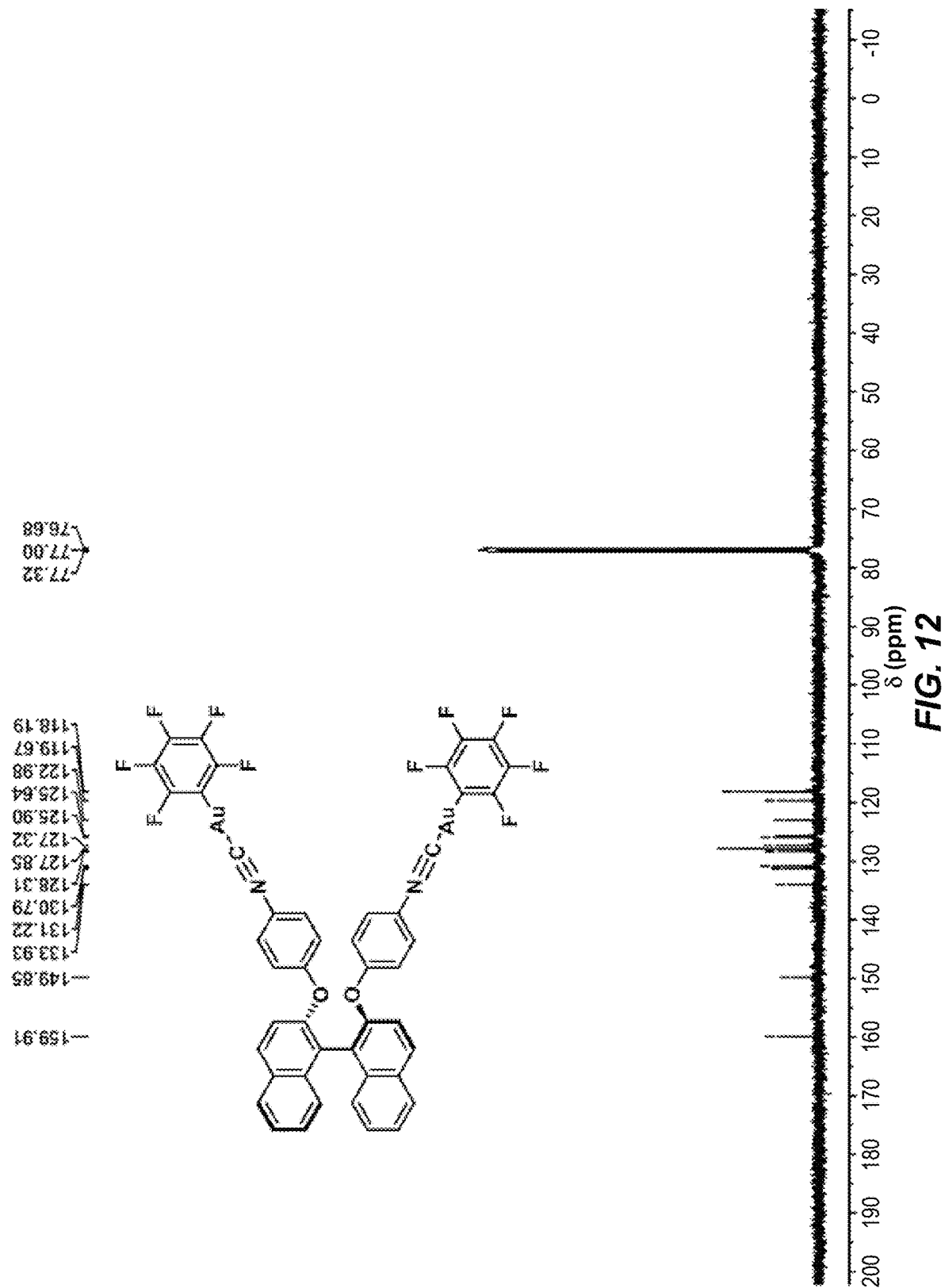
FIG. 12 depicts $^{13}$C NMR spectrum of (R)-1 in CDCl$_3$.
Figure 13:
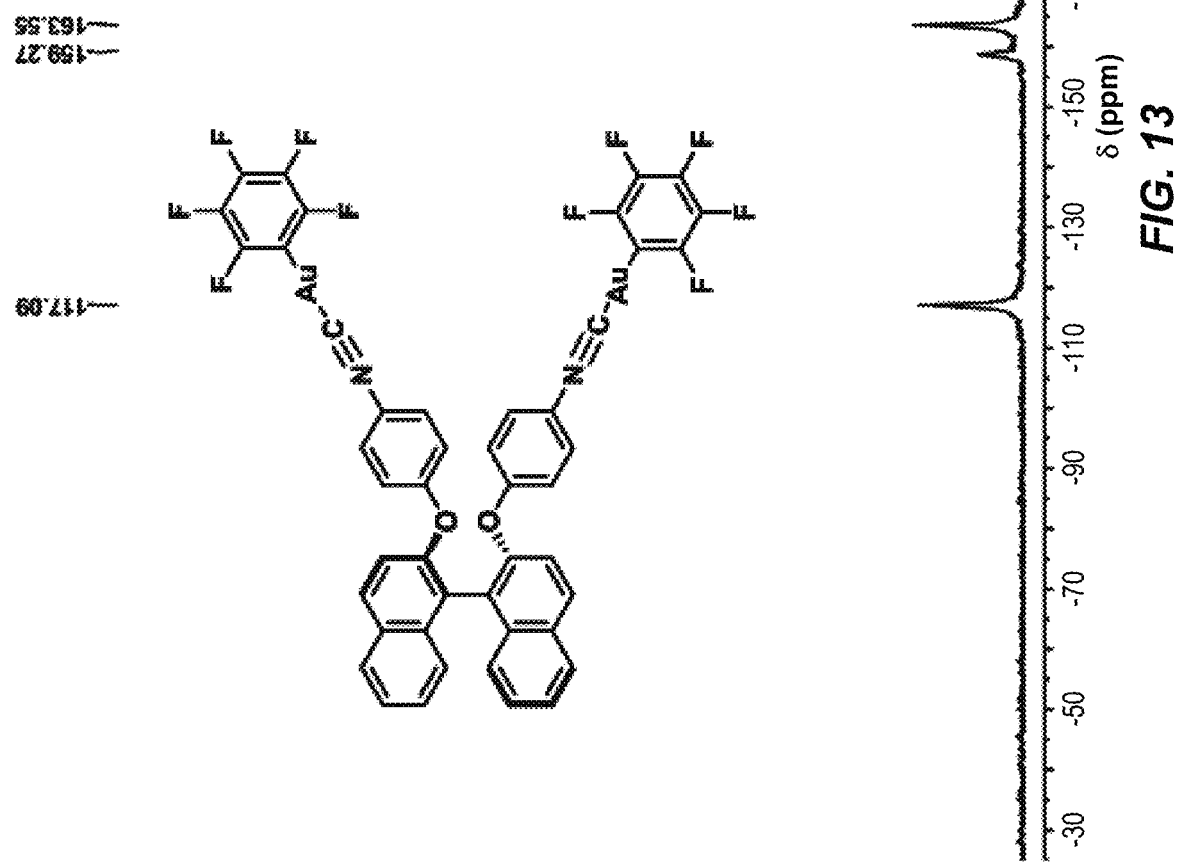
FIG. 13 depicts $^{19}$F NMR spectrum of (R)-1 in CDCl$_3$.
Figure 14:
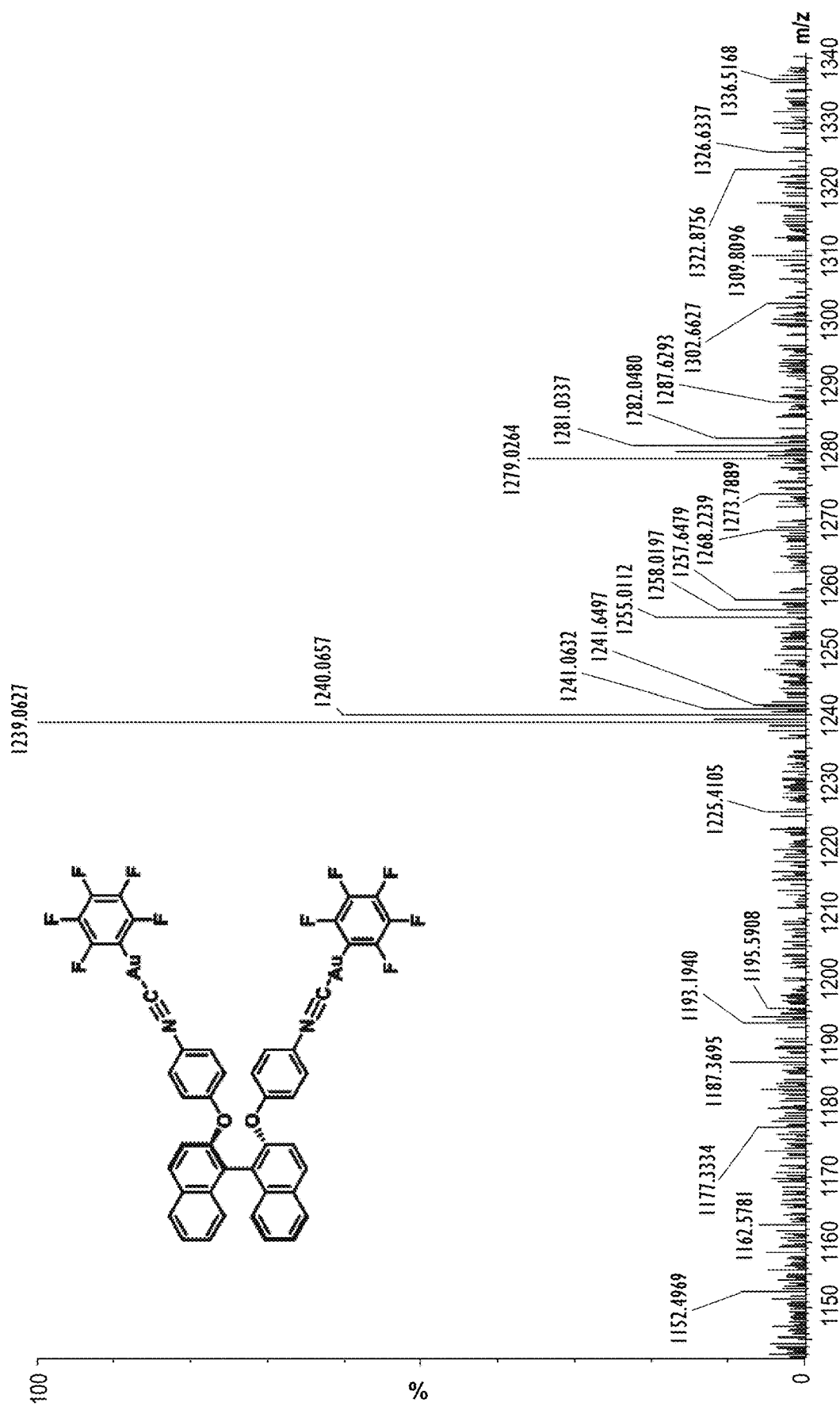
FIG. 14 depicts HR-MS spectrum of (R)-1.

The following definitions are provided for the purpose of understanding the present subject matter and for constructing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein The use of the terms "include," "includes", "including," "have," "has," or "having" should be generally understood as open-ended and non-limiting unless specifically stated otherwise.

The use of the singular herein includes the plural (and vice versa) unless specifically stated otherwise.

It should be understood that the order of steps or order for performing certain actions is immaterial so long as the present teachings remain operable. Moreover, two or more steps or actions may be conducted simultaneously.

The term "$\lambda_{ex}$" as used herein refers to excitation wavelength.

The phrase "aggregation caused quenching" or "ACQ" as used herein refers to the phenomenon wherein the aggregation of π-conjugated fluorophores significantly decreases the fluorescence intensity of the fluorophores. The aggregate formation is said to "quench" light emission of the fluorophores.

The phrase "aggregation induced emission" or "AIE" as used herein refers to the phenomenon manifested by compounds exhibiting significant enhancement of light-emission upon aggregation in the amorphous or crystalline (solid) states whereas they exhibit weak or almost no emission in dilute solutions.

"Emission intensity" as used herein refers to the magnitude of fluorescence/phosphorescence normally obtained from a fluorescence spectrometer or fluorescence microscopy measurement; "fluorophore" or "fluorogen" as used herein refers to a molecule which exhibits fluorescence; "luminogen" or "luminophore" as used herein refers to a molecule which exhibits luminescence; and "AIEgen" as used herein refers to a molecule exhibiting AIE characteristics.

As used herein, "halo" or "halogen" refers to fluoro, chloro, bromo, and iodo.

As used herein, "alkyl" refers to a straight-chain or branched saturated hydrocarbon group. Examples of alkyl groups include methyl (Me), ethyl (Et), propyl (e.g., n-propyl and z'-propyl), butyl (e.g., n-butyl, z'-butyl, sec-butyl, tert-butyl), pentyl groups (e.g., n-pentyl, z'-pentyl, -pentyl), hexyl groups, and the like. In various embodiments, an alkyl group can have 1 to 40 carbon atoms (i.e., C1-40 alkyl group), for example, 1-30 carbon atoms (i.e., C1-30 alkyl group). In some embodiments, an alkyl group can have 1 to 6 carbon atoms, and can be referred to as a "lower alkyl group". Examples of lower alkyl groups include methyl, ethyl, propyl (e.g., n-propyl and z'-propyl), and butyl groups (e.g., n-butyl, z'-butyl, sec-butyl, tert-butyl). In some embodiments, alkyl groups can be substituted as described herein. An alkyl group is generally not substituted with another alkyl group, an alkenyl group, or an alkynyl group.

As used herein, "alkenyl" refers to a straight-chain or branched alkyl group having one or more carbon-carbon double bonds. Examples of alkenyl groups include ethenyl, propenyl, butenyl, pentenyl, hexenyl, butadienyl, pentadienyl, hexadienyl groups, and the like. The one or more carbon-carbon double bonds can be internal (such as in 2-butene) or terminal (such as in 1-butene). In various embodiments, an alkenyl group can have 2 to 40 carbon atoms (i.e., C2-40 alkenyl group), for example, 2 to 20 carbon atoms (i.e., C2-20 alkenyl group). In some embodiments, alkenyl groups can be substituted as described herein. An alkenyl group is generally not substituted with another alkenyl group, an alkyl group, or an alkynyl group.

As used herein, "heteroatom" refers to an atom of any element other than carbon or hydrogen and includes, for example, nitrogen, oxygen, silicon, sulfur, phosphorus, and selenium.

As used herein, "aryl" refers to an aromatic monocyclic hydrocarbon ring system or a polycyclic ring system in which two or more aromatic hydrocarbon rings are fused (i.e., having a bond in common with) together or at least one aromatic monocyclic hydrocarbon ring is fused to one or more cycloalkyl and/or cycloheteroalkyl rings. An aryl group can have 6 to 24 carbon atoms in its ring system (e.g., C6-24 aryl group), which can include multiple fused rings. In some embodiments, a polycyclic aryl group can have 8 to 24 carbon atoms. Any suitable ring position of the aryl group can be covalently linked to the defined chemical structure. Examples of aryl groups having only aromatic carbocyclic ring(s) include phenyl, 1-naphthyl (bicyclic), 2-naphthyl (bicyclic), anthracenyl (tricyclic), phenanthrenyl (tricyclic), pentacenyl (pentacyclic), and like groups. Examples of polycyclic ring systems in which at least one aromatic carbocyclic ring is fused to one or more cycloalkyl and/or cycloheteroalkyl rings include, among others, benzo derivatives of cyclopentane (i.e., an indanyl group, which is a 5,6-bicyclic cycloalkyl/aromatic ring system), cyclohexane (i.e., a tetrahydronaphthyl group, which is a 6,6-bicyclic cycloalkyl/aromatic ring system), imidazoline (i.e., a benzimidazolinyl group, which is a 5,6-bicyclic cycloheteroalkyl/aromatic ring system), and pyran (i.e., a chromenyl group, which is a 6,6-bicyclic cycloheteroalkyl/aromatic ring system). Other examples of aryl groups include benzodioxanyl, benzodioxolyl, chromanyl, indolinyl groups, and the like. In some embodiments, aryl groups can be substituted as described herein. In some embodiments, an aryl group can have one or more halogen substituents, and can be referred to as a "haloaryl" group. Perhaloaryl groups, i.e., aryl groups where all of the hydrogen atoms are replaced with halogen atoms (e.g., —$C_6F_5$), are included within the definition of "haloaryl". In certain embodiments, an aryl group is substituted with another aryl group and can be referred to as a biaryl group. Each of the aryl groups in the biaryl group can be substituted as disclosed herein.

As used herein, "heteroaryl" refers to an aromatic monocyclic ring system containing at least one ring heteroatom selected from oxygen (O), nitrogen (N), sulfur (S), silicon (Si), and selenium (Se) or a polycyclic ring system where at least one of the rings present in the ring system is aromatic and contains at least one ring heteroatom. Polycyclic heteroaryl groups include those having two or more heteroaryl rings fused together, as well as those having at least one monocyclic heteroaryl ring fused to one or more aromatic carbocyclic rings, non-aromatic carbocyclic rings, and/or non-aromatic cycloheteroalkyl rings. A heteroaryl group, as a whole, can have, for example, 5 to 24 ring atoms and contain 1-5 ring heteroatoms (i.e., 5-20 membered heteroaryl group). The heteroaryl group can be attached to the defined chemical structure at any heteroatom or carbon atom that results in a stable structure. Generally, heteroaryl rings do not contain O—O, S—S, or S—O bonds. However, one or more N or S atoms in a heteroaryl group can be oxidized (e.g., pyridine Noxide thiophene S-oxide, thiophene S,S-dioxide). Examples of heteroaryl groups include, for example, the 5- or 6-membered monocyclic and 5-6 bicyclic ring systems shown below:

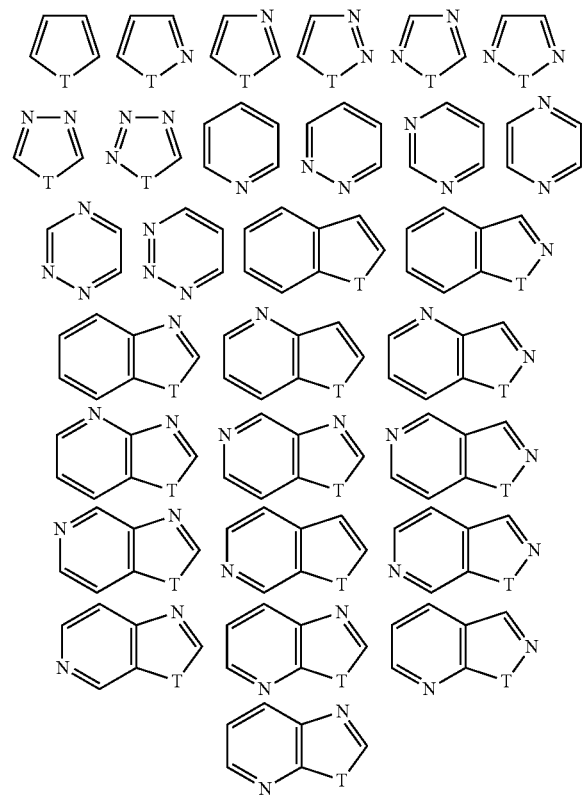

where T is O, S, NH, N-alkyl, N-aryl, N-(arylalkyl) (e.g., N-benzyl), SiH2, SiH(alkyl), Si(alkyl)2, SiH(arylalkyl), Si(arylalkyl)2, or Si(alkyl)(arylalkyl). Examples of such heteroaryl rings include pyrrolyl, furyl, thienyl, pyridyl, pyrimidyl, pyridazinyl, pyrazinyl, triazolyl, tetrazolyl, pyrazolyl, imidazolyl, isothiazolyl, thiazolyl, thiadiazolyl, isoxazolyl, oxazolyl, oxadiazolyl, indolyl, isoindolyl, benzofuryl, benzothienyl, quinolyl, 2-methylquinolyl, isoquinolyl, quinoxalyl, quinazolyl, benzotriazolyl, benzimidazolyl, benzothiazolyl, benzisothiazolyl, benzisoxazolyl, benzoxadiazolyl, benzoxazolyl, cinnolinyl, 1H-indazolyl, 2H-indazolyl, indolizinyl, isobenzofuyl, naphthyridinyl, phthalazinyl, pteridinyl, purinyl, oxazolopyridinyl, thiazolopyridinyl, imidazopyridinyl, furopyridinyl, thienopyridinyl, pyridopyrimidinyl, pyridopyrazinyl, pyridopyridazinyl, thienothiazolyl, thienoxazolyl, thienoimidazolyl groups, and the like. Further examples of heteroaryl groups include 4,5,6,7-tetrahydroindolyl, tetrahydroquinolinyl, benzothienopyridinyl, benzofuropyridinyl groups, and the like. In some embodiments, heteroaryl groups can be substituted as described herein.

As used herein, "circularly polarized luminescence (CPL)" is luminescence that provides the differential emission intensity of right and left circularly polarized light.

As used herein, a "donor" material refers to an organic material, for example, an organic nanoparticle material, having holes as the majority current or charge carriers.

As used herein, an "acceptor" material refers to an organic material, for example, an organic nanoparticle material, having electrons as the majority current or charge carriers.

As used herein, a "theranostic agent" refers to an organic material, for example, an organic nanoparticle material, having both diagnostic and therapeutic capabilities.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Fluorescent Compounds

The present subject matter relates to a fluorescent compound having aggregation-induced emission (AIE) characteristics. The fluorescent compound, also referred to herein as "chiral Au complex," comprises an AIE-active, chiral binaphthyl isocyanide Au(I) complex, which undergoes spontaneous hierarchical self-assembly in aggregate to achieve inversed helical architectures. As described herein, in situ and real-time CD monitoring and SEM imaging can be employed to detect the entire dynamic self-assembly process.

In an embodiment, the compound includes the following structural formula:

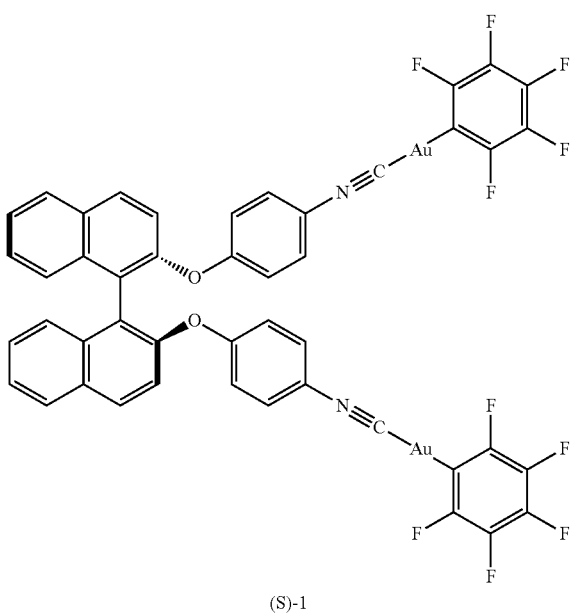

(S)-1 or an enantiomer thereof.

In an embodiment, the enantiomer includes

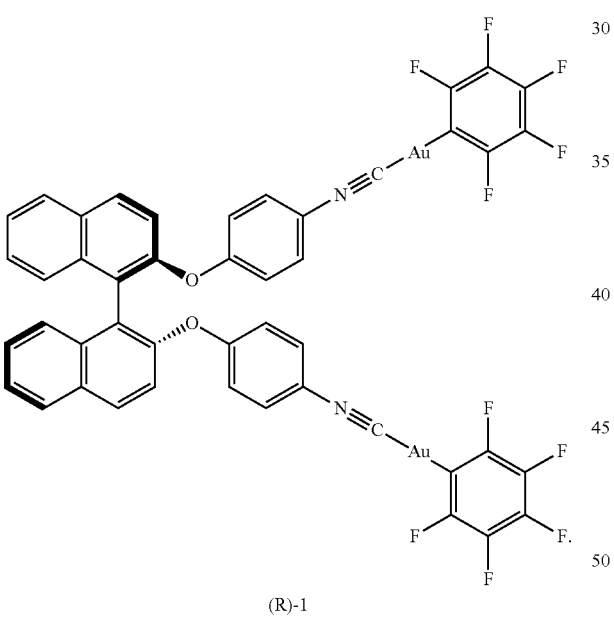

(R)-1

The compound can undergo spontaneous hierarchical self-assembly from a vesicle to a helical fiber in the aggregate state. The hierarchical self-assembly process can be monitored using at least one of circular dichroism (CD) spectroscopy, scanning electron microscopy (SEM), and transmission electron microscopy (TEM). In an embodiment, as described herein, the hierarchical architecture processes of the compound can be monitored in real time using CD spectra. SEM and AFM imaging can be used to capture the transitory morphologies from vesicles to helical fibers which are formed at corresponding stages of aggregation.

CPL Composition

The present fluorescent compound is an ideal chiral template for synthesizing compositions which provide desirable circular polarized luminescence (CPL) signals upon photo- or electro-excitation. CPL is a highly sensitive and powerful tool for evaluating excited state stereochemical, three-dimensional structural and conformational information of chiral luminescence systems. CPL materials can be used toward a variety of applications, including phototechnology and biosensor technology.

The controllable induction of CPL signals from achiral luminogens can be realized by utilizing the present chiral compound as a chiral transcription template to construct a co-assembly or composition capable of providing CPL. Compared with traditional construction methods of CPL materials, this strategy is simpler and avoids the tedious syntheses of expensive chiral materials. Moreover, the controllability and diversity of CPL materials can be realized through this co-assembly construction. In an embodiment, a composition or co-assembly system that provides controllable CPL induction upon photo- or electro-excitation can be synthesized using the chiral Au complex (S)-1 or (R)-1 as a chiral template and an achiral luminogen as the acceptor. The intensity and direction of the CPL can be tuned by choosing different luminogens in the co-assembly. As the maximum value of $|g_{lum}|$ is 2, the composition can have a high dissymmetry factor $g_{lum}$.

An embodiment of the present subject matter relates to a composition capable of providing circularly polarized luminescence. The composition can include the fluorescent compound and at least one compound selected from the group consisting of an aggregation-caused quenching luminogen and an aggregation-induced emission luminogen.

In an embodiment the composition includes the fluorescent compound and at least one compound selected from

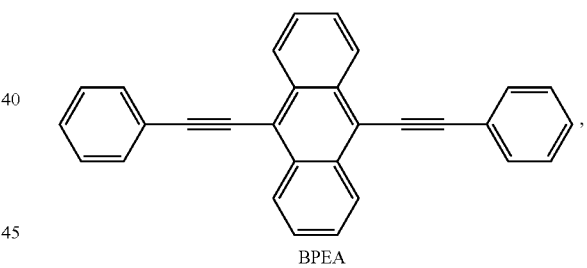

BPEA

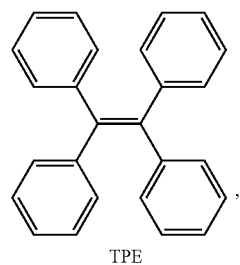

TPE

-continued

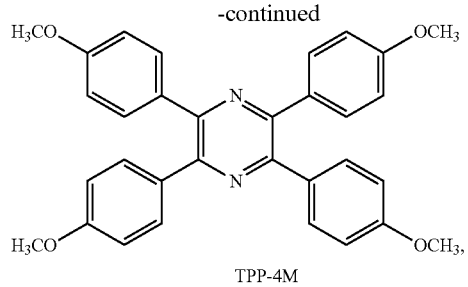
TPP-4M, and

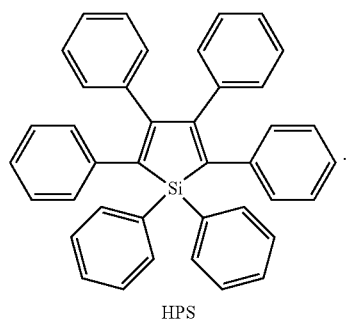
HPS

Another embodiment relates to a composition capable of providing circularly polarized luminescence comprises a chiral compound and at least one additional compound selected from the group consisting of an aggregation-caused quenching luminogen and an aggregation-induced emission luminogen, wherein the composition provides circularly polarized luminescence. In an embodiment, the chiral compound includes one or more gold atoms.

In an embodiment, the chiral compound is

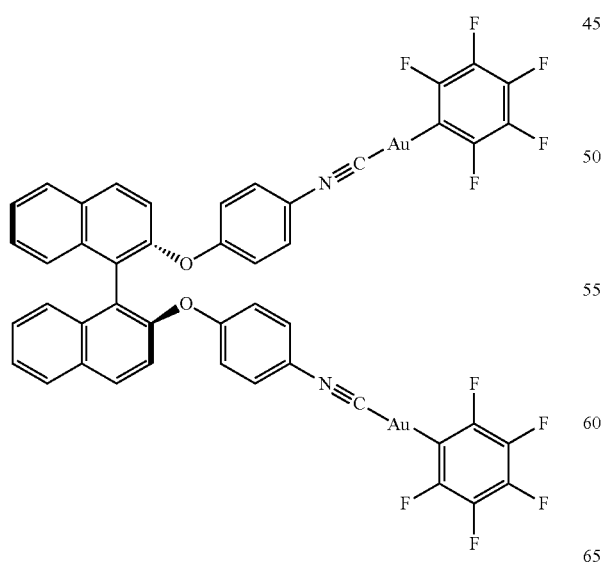

or an enantiomer thereof.

In an embodiment, the enantiomer is

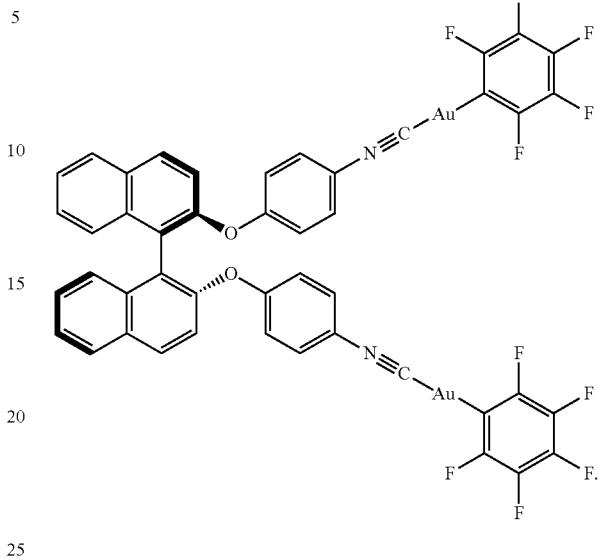

In an embodiment, the at least one additional compound is selected from the group consisting of:

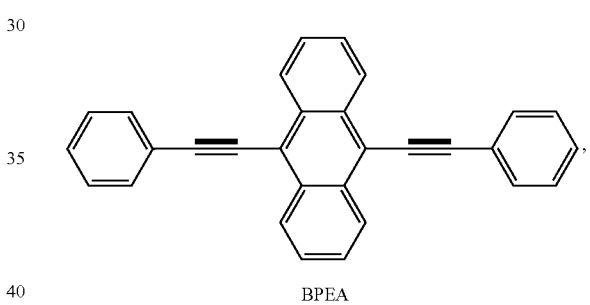
BPEA

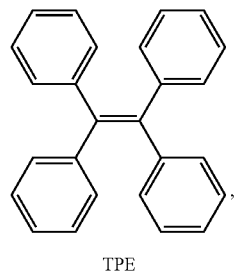
TPE

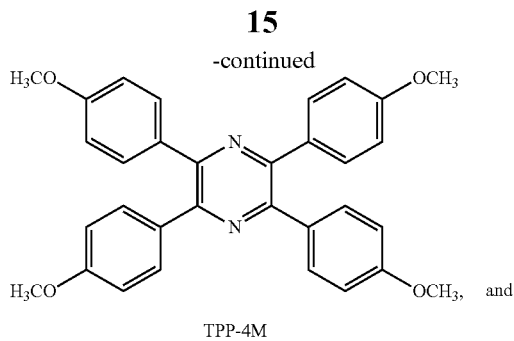

TPP-4M

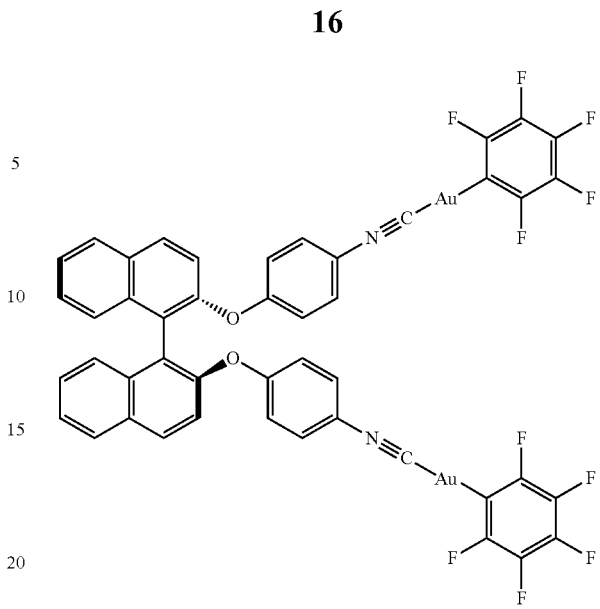

or an enantiomer thereof; and co-assembling the fluorescent compound with at least one other compound, the at least one other compound being selected from the group consisting of an aggregation-caused quenching luminogen and an aggregation-induced emission luminogen.

The present teachings are illustrated by the following examples.

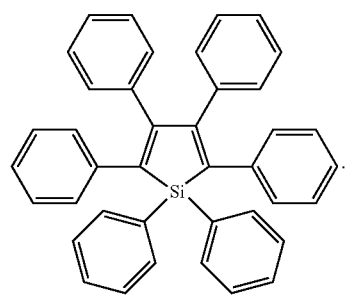

HPS

In an embodiment, a method of synthesizing a composition capable of providing circularly polarized luminescence includes: providing a fluorescent compound exhibiting aggregation induced emission properties, the fluorescent compound having the following structural formula

EXAMPLES

Example 1

Synthesis

The Au(I) complexes (S)-1 and (R)-1 were prepared using the following synthetic route:

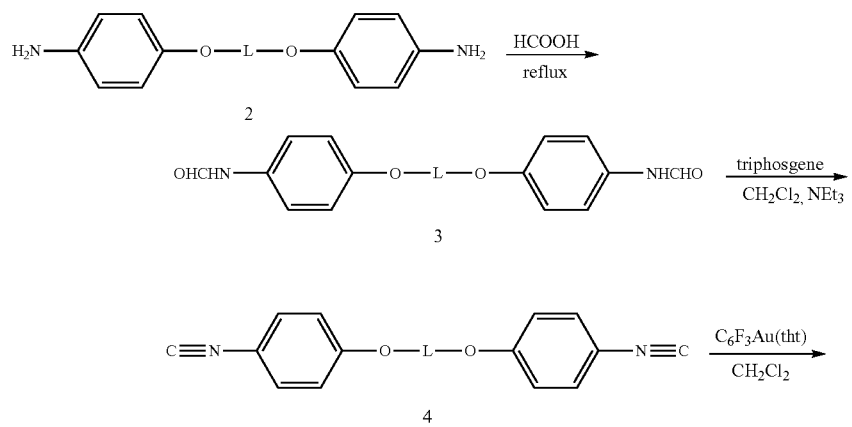

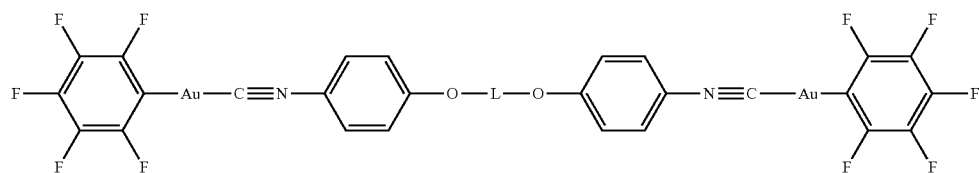

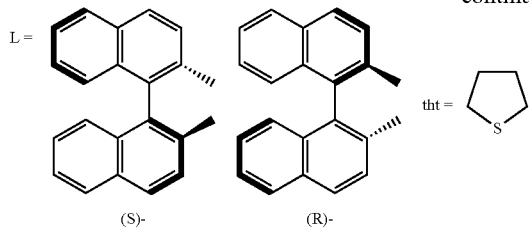

All of the intermediates and desirable products were characterized by NMR and high-resolution mass spectroscopies with satisfactory results (FIGS. 1-14).

The molecular structures of complexes (S)-1 and (R)-1 were resolved by single crystal X-ray diffraction and the associated data is provided in Table 1.

TABLE 1

Crystal data and parameters of data collection and refinement for complexes (S)-1 and (R)-1.

| Complex | (S)-1 | (R)-1 |
|---|---|---|
| Empirical formula | $C_{46}H_{20}Au_2F_{10}N_2O_2$ | $C_{46}H_{20}Au_2F_{10}N_2O_2$ |
| Formula weight | 1216.57 | 1216.57 |
| Temperature (K) | 298 (2) | 296 (2) |
| Crystal system | Orthorhombic | Orthorhombic |
| Space group | P2 (1)2 (1)2 (1) | P2 (1)2 (1)2 (1) |
| a (Å) | 12.3858 (17) | 12.2598 (7) |
| b (Å) | 13.5988 (18) | 13.5628 (8) |
| c (Å) | 27.689 (4) | 27.4967 (16) |
| α (°) | 90 | 90 |
| β (°) | 90 | 90 |
| γ (°) | 90 | 90 |
| V (Å$^3$) | 4663.8 (11) | 4572.1 (5) |
| Z | 4 | 4 |
| Density (calculated) (Mg/m$^3$) | 1.733 | 1.767 |
| Absorption coefficient (mm$^{-1}$) | 6.361 | 6.488 |
| F (000) | 2296 | 2296 |
| Crystal size (mm$^3$) | 0.20 × 0.20 × 0.20 | 0.15 × 0.12 × 0.10 |
| Theta range for data collection (°) | 1.47 to 24.36 | 1.48 to 22.26 |
| Index ranges | −14 ≤ h ≤ 14, −15 ≤ k ≤ 15, −32 ≤ l ≤ 29 | −13 ≤ h ≤ 13, −14 ≤ k ≤ 14, −28 ≤ l ≤ 29 |
| Reflections collected | 30413 | 24469 |
| Independent reflections | 7564 [R(int) = 0.0511] | 5743 [R(int) = 0.0321] |
| Max. and min. transmission | 0.3627 and 0.3627 | 0.5631 and 0.4428 |
| Data/restraints/parameters | 7564/36/500 | 5743/57/499 |
| Goodness-of-fit on F$^2$ | 1.037 | 1.113 |
| Final R indices [I > 2σ(I)] | R1 = 0.0581, wR2 = 0.1564 | R1 = 0.0414, wR2 = 0.1237 |
| Final R indices (all data) | R1 = 0.0922, wR2 = 0.1843 | R1 = 0.0497, wR2 = 0.1302 |
| Largest diff. peak and hole | 2.149 and −1.942 e.$^3$ | 1.638 and −0.568 e.$^3$ |

Example 2

Photophysical Properties

Figure 15B:
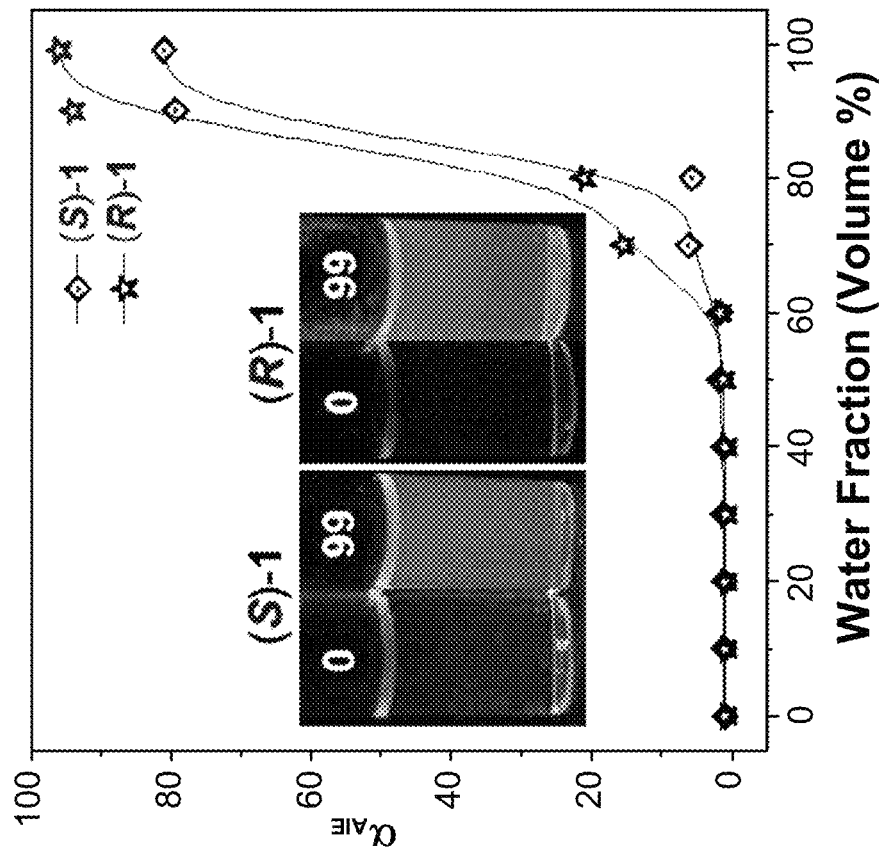
FIGS. 15A-15B depict (A) PL spectra of complexes (S)-1 and (R)-1 in THF-water mixtures, $\lambda_{ex}$=335 nm (concentration: 5.0×10$^{-5}$ M); and (B) plot of relative emission peak intensity ($\alpha_{AIE}$) at 560 nm versus $f_w$ of the THF/water mixtures, where $\alpha_{AIE}$=I/I$_0$, I=emission intensity and I$_0$=emission intensity in THF solution, (inset: photos taken under 365 nm UV).
Figure 15A:
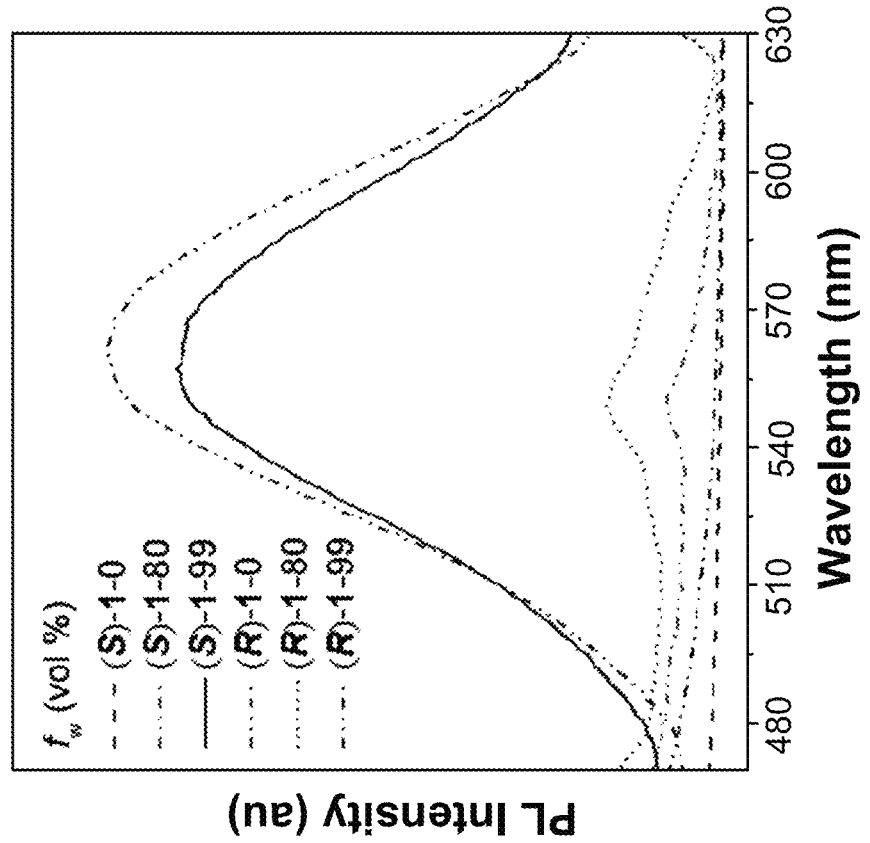

Complexes (S)-1 and (R)-1 exhibited typical AIE properties, as evidenced by their respective photoluminescence (PL) spectra measured in the pure THF solution and aggregate states (FIGS. 15A-15B). Initially, their PL intensities were nearly zero with no emission in mixtures with water fraction ($f_w$, vol %) less than 70%. When the water contents were increased to 70% and 80%, weak orange emission bands centered at 560 nm appeared, which originated from the singlet metal-perturbed π-π* ligand-centred excited states of the binaphthyl-isocyano and pentafluorophenyl ligands. Furthermore, the newly appeared emission was dramatically enhanced with the increase of water fraction to 90% and ultimately reached a maximum with 99% water.

In light of the chiral nature of these two complexes, circular dichroism (CD) experiments were further performed to study the chirality of their aggregate states. As shown in FIGS. 16A-16D, the CD spectra of (S)-1 and (R)-1 display intense Cotton effects and a mirror-image relationship at the wavelength of 200-400 nm. Compared with pure THF solution, the CD bands and the corresponding absorption bands located at around 260 nm and 300 nm of a series of aggregate states, exhibited distinct differences (FIGS. 16A-16D), indicating that the chirality of the present enantiomers are sensitive to the change of the surrounding solvent environment.

The freshly prepared mixtures containing 80% water (THF-water, 1/4, v/v) of complexes (S)-1 and (R)-1 were clear, but became turbid after one hour of aging, indicative of the formation of large aggregates with strong light scattering. It could be reasonably envisaged that appropriate self-assembly processes might occur in the THF-water (1/4, v/v) mixture. The highly sensitive CD spectrometer monitored a continuous transition of the helical assemblies. An in situ and time-dependent CD monitoring of the dynamic transition of the chiral nanostructures in the above critical THF-water (1/4, v/v) systems was conducted. Complex (R)-1 (1×10$^{-4}$ M) was picked out as the representative for the following elaboration.

Figures 16A, 16B, 16C:
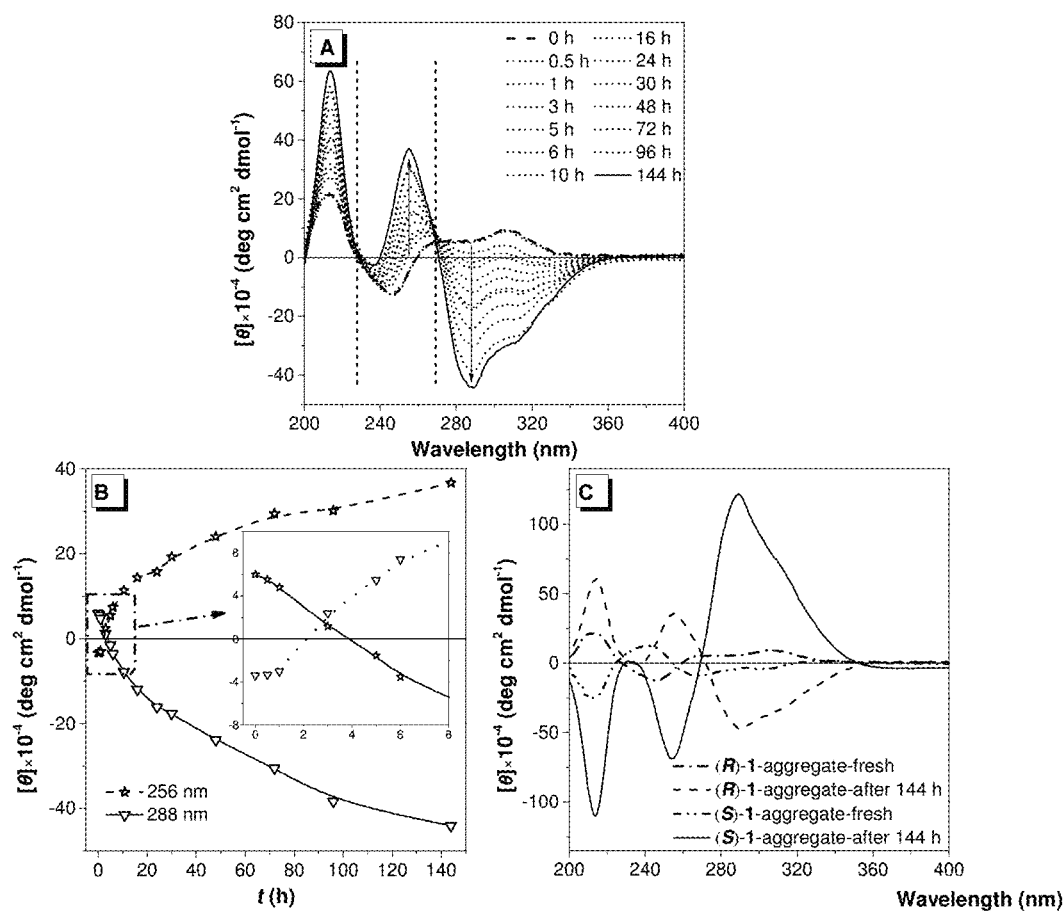
FIGS. 16A-16C depict (A) the time-dependent CD spectra of [θ] versus time of complex (R)-1 measured in THF-water (1/4, v/v) mixture; (B) the time-dependent plot of [θ] versus time of complex (R)-1 measured in THF-water (1/4, v/v) mixture; and (C) CD spectra of complexes (S)-1 and (R)-1 measured in THF-water (1/4, v/v) mixtures (concentration: 1×10$^{-4}$ M. [θ]=molar ellipticity).

As shown in FIG. 16A, the CD curve of the freshly prepared THF-water (1/4, v/v) mixture showed a weak positive signal at the wavelength of ~300 nm and two relatively strong signals at the wavelength of ~250 nm and 230 nm, respectively, which are attributed to absorption of the chiral binaphthyl moieties. The broad peak at the wavelength of 300 nm began to decrease with prolonged incubation time, and became reversed after 3 hours of incubation time. After an incubation period of 144 hours, the peak exhibited the highest negative signal with a remarkable molar ellipticity ([θ]) value of 440000 deg cm$^2$ dmol$^{-1}$. A similar inversion of absorption was observed for the peak at the wavelength of ~250 nm. The plot of [θ] versus time in FIG. 16B showed a much more intuitive picture of the above inversions. The band at the wavelength of 210 nm showed only a monotonous enhancement with the prolonged incubation time. The CD profile of enantiomer (S)-1 exhibited almost a mirror reversion with that of (R)-1 and its intensity was with a more remarkable amplification of 14-fold, higher than the 9-fold of the latter (FIG. 16C). Herein, the results of the above in situ CD monitoring preliminarily verified the hypothesis that the molecules undergo multiple morphological transitions before forming the steady self-assembly. This morphological transitional process was very slow and took place over a period of hours, which offered the possibility of monitoring the morphological transition.

Figures 17A, 17B, 17C, 17D, 17E, 17F:
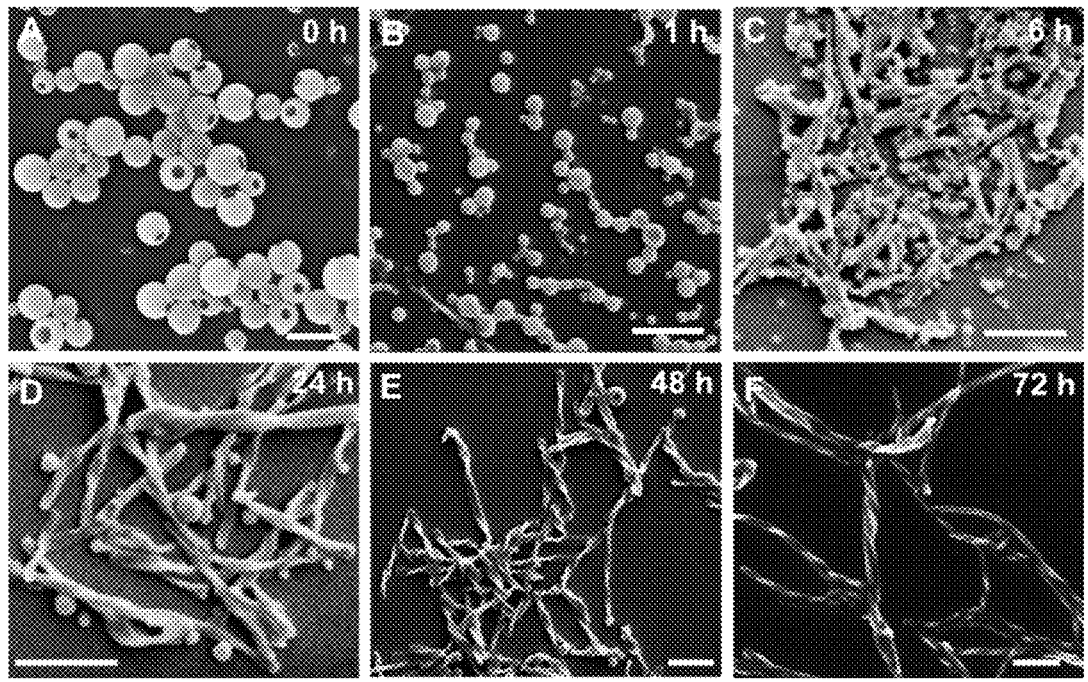
FIGS. 17A-17F depicts (A) SEM image of vesicle morphology of complex (R)-1 (THF/water: 1/3, v/v); (B)-(F) time-dependent SEM images to visualize the self-assembly processes of complex (R)-1 (images were obtained from the evaporation of the mixtures of THF/water (1/4, v/v) stored for different time) (concentration: 1×10$^{-4}$ M, scale bar is 500 nm).
Figures 18A, 18B:
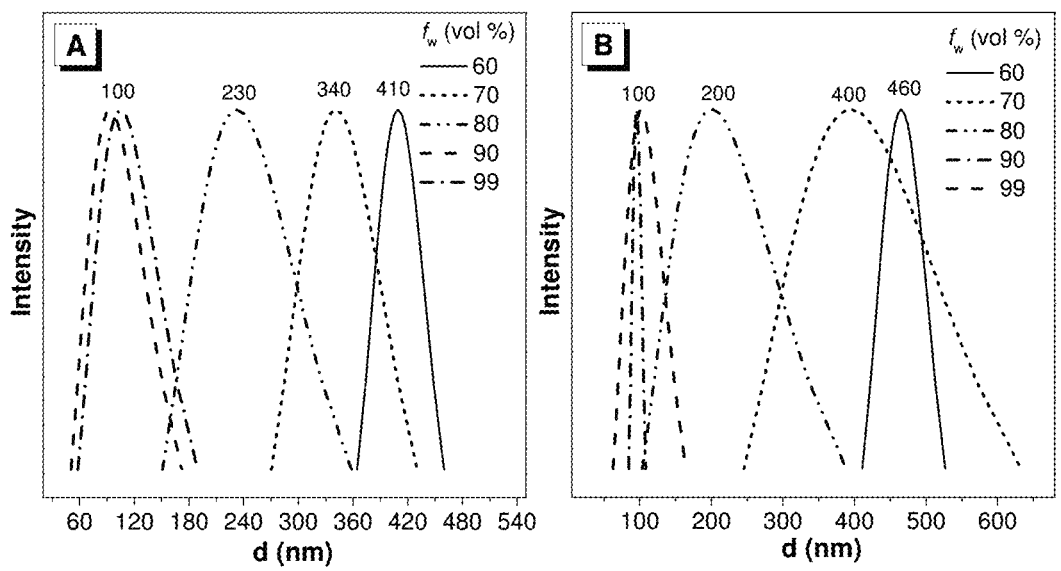
FIGS. 18A-18B depict (A) dynamic scattering spectrum of complex (S)-1 measured in different THF-water mixtures (concentration: 2×10$^{-5}$ M); and (B) dynamic scattering spectrum of complex (R)-1 measured in different THF-water mixtures (concentration: 2×10$^{-5}$ M).
Figures 19A, 19B, 19C, 19D, 19E, 19F:
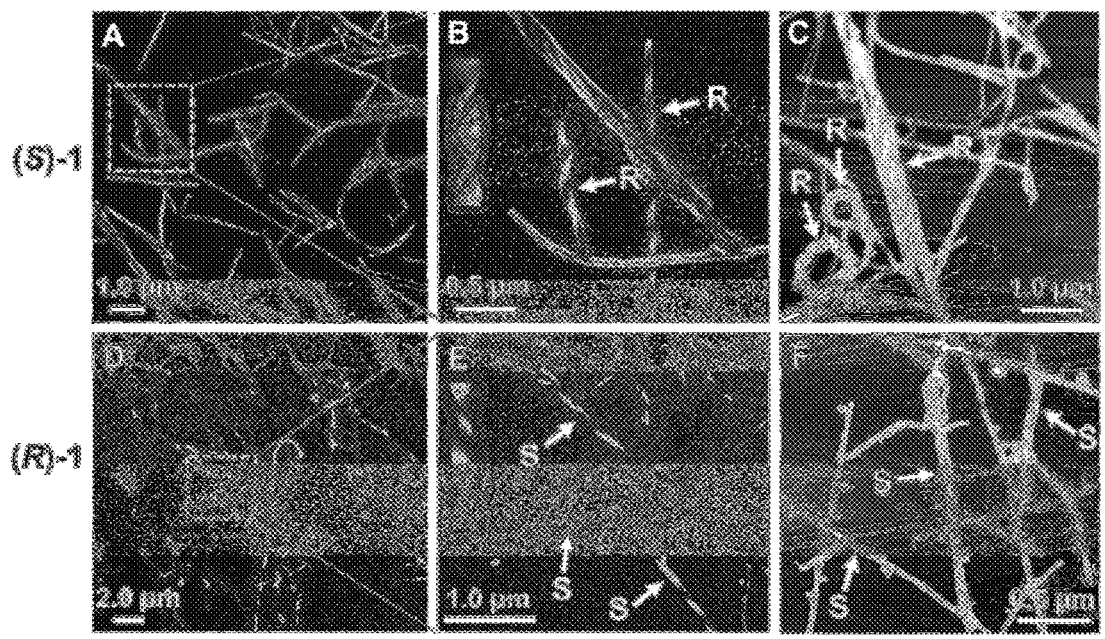
FIGS. 19A-19F depict (A) helical fibers formed by complex (S)-1 from the evaporation of the mixtures of THF/water (1/4, v/v) stored for 72 h (three days) at room temperature; (B) zoomed-in image of the labeled area in image of (A); (C) AFM image of the helical assemblies of complex (S)-1; (D) helical fibers formed by complex (R)-1 from the evaporation of the mixtures of THF/water (1/4, v/v) stored for 72 h (three days) at room temperature; (E) zoomed-in image of the labeled area in image of (D); (F) AFM image of the helical assemblies of complex (R)-1 (concentration: 1×10$^{-4}$ M; helicity of the fibers are indicated with arrows).

Visual confirmation of the nanostructures formed at the specific stages were then garnered from microscopic imaging. As expected, further time-dependent morphological changes of (R)-1 observed directly by SEM, AFM and TEM unambiguously proved the proposed self-assembly processes. As shown in FIGS. 17A-17F, vesicles were formed upon aggregation in the freshly prepared THF-water mixtures, and their average diameters decreased with the increase of water fractions consistent with the DLS data (FIGS. 18A-18B). To better unveil the reason for the chiral inversion and amplification observed in CD spectra, morphological monitoring of the self-assembled structures by SEM at different time intervals of the incubation of the six days was conducted. As shown in FIG. 17B, the vesicles began to coalesce one-by-one in a linear way and formed a "necklace"-like morphology after one hour of incubation. The initially formed vesicles gradually grew into loosely twisted helical ribbons or fibers with the axial elongation and fusion after six hours. After three days, compactly twisted helical fibers with the helical pitch of ~300 nm were formed, where spirals could be clearly observed (FIG. 17F). The helical fibers by (S)-1 are right-handed (R) (FIGS. 19A-19C), whereas the helical nanofibers formed by (R)-1 are left-handed (S) (FIGS. 19D-19F), implying that a conversion of the handedness might occur in the formation of the supramolecular self-assembly from elementary building blocks.

Figures 20A, 20B:
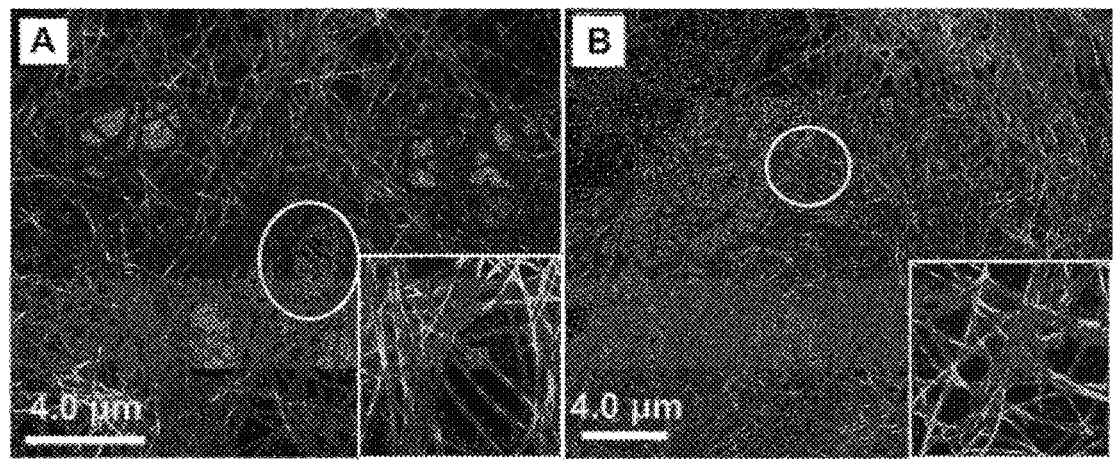
FIGS. 20A-20B depict (A) SEM image of helical fibers formed by complex (S)-1 from the evaporation of the mixture of THF/water (1/4, v/v) stored for six days; (B) SEM image of helical fibers formed by complex (R)-1 from the evaporation of the mixture of THF/water (1/4, v/v) stored for six days (concentration: 1×10−4 M; inset: zoomed-in image of the labeled area).

The morphological transition process can be determined based on these images, which can help to rationalize the time-dependent variation in CD signal as follows: 1) for the freshly prepared mixture of THF/water, the chiral signals originated from the molecular chirality, mainly associated with the chiral binaphthyl moieties; 2) in the following three hours, with the fusion of vesicle aggregates and further formation of loosely twisted ribbons, the chirality generating from the newly-formed self-assembly system was opposite with the molecular chirality and would counterpart with it, causing the original CD signal to decrease; 3) subsequently, the formation of compact helix gradually dominates the chiral environment and the overall supramolecular chirality ultimately supersedes the molecular chirality (and the opposite handedness of helical fibers renders the CD signal completely inversed); 4) in the final stage, much longer helical fibers with micrometer scale (FIG. 20) ultimately formed over six days.

Concomitantly, supramolecular chirality is further significantly amplified, well consistent with the remarkable increase in CD signal. Similarly, for bio-mimetic self-assembly, in most cases, their molecular chirality is also transferred to their self-assembled aggregates through hierarchical approach, which ensures a very efficient outcome for the generation of highly functional self-assembled structures.

For the above self-assembly systems, obvious CPL signals were not detected. This was probably due to the weak luminescence of the enantiomers.

Example 3

CPL Compositions

A role-sharing and complementary strategy to construct a two-component co-assembly system was employed wherein the chiral Au complexes (S)-1 and (R)-1 were used as chiral templates and typical luminogens were selected to act as the chiral acceptors. The two components were expected to perform cooperatively to realize a higher output of a CPL-active system.

Figures 21A, 21B:
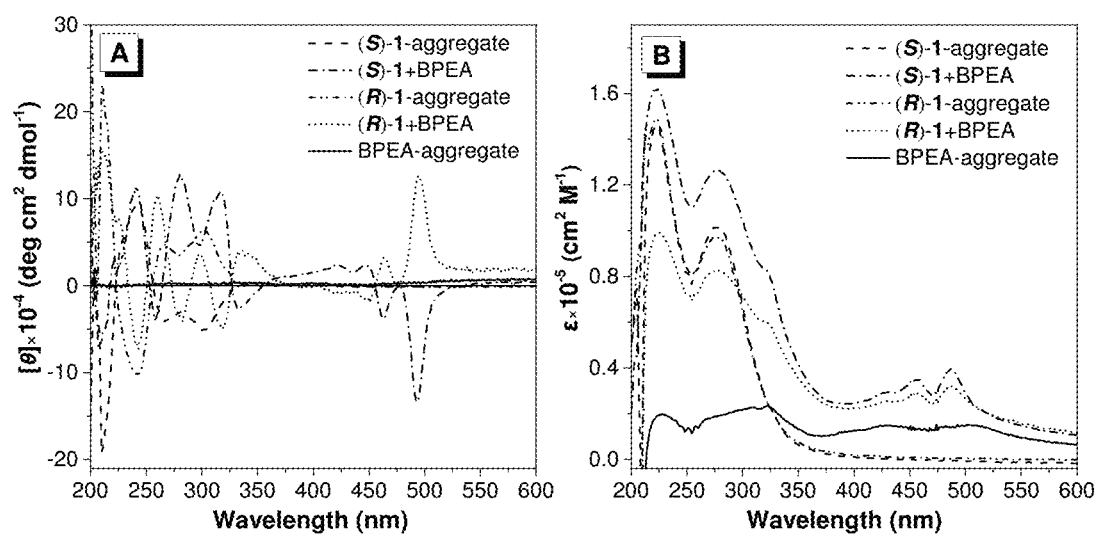
FIGS. 21A-21B depict (A) CD spectra of complexes (S)-1 and (R)-1 in the mixture of THF/water (1:4) measured in the absence and presence of BPEA (concentration: 5×10$^{-5}$ M); (B) UV spectra of complexes (S)-1 and (R)-1 in the mixture of THF/water (1:4) measured in the absence and presence of BPEA (concentration: 5×10$^{-5}$ M).
Figure 22A:
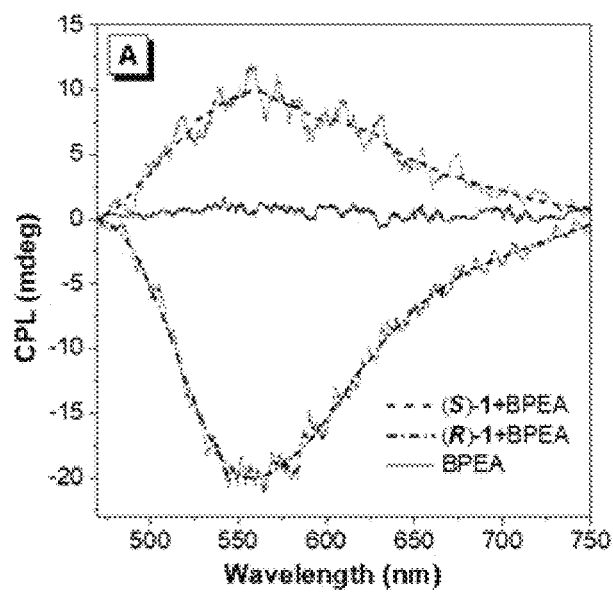
FIGS. 22(A)-22(C) depict CPL spectra of complexes (S)-1 and (R)-1 induced by adding different luminogens (1/1, molar ratio) measured in THF-water (1/4, v/v) mixtures (concentration: 5×10$^{-5}$ M. $\lambda_{ex}$=365 nm (added BPEA), 330 nm (added TPE), and 340 nm (added TPP-4M).
Figure 22B:
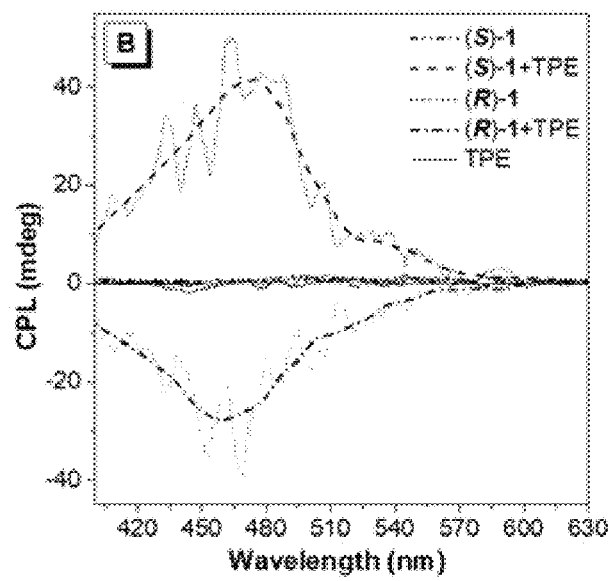
Figure 22C:
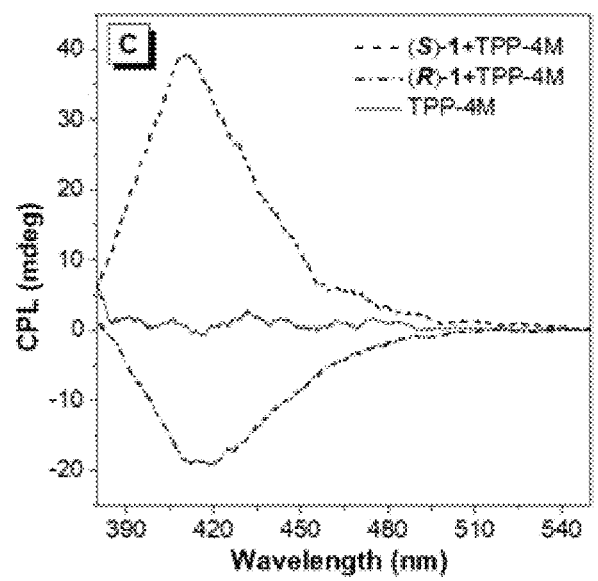
Figure 23A:
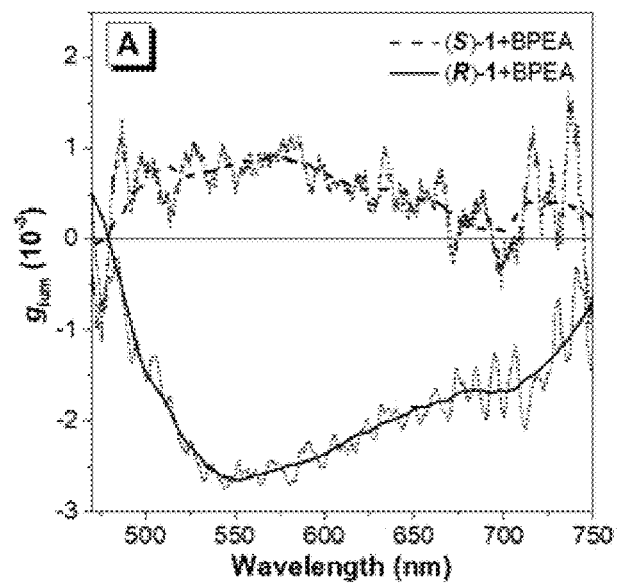
FIGS. 23(A)-23(C) depict CPL dissymmetry factor $g_{lum}$ of (S)-1 and (R)-1 induced by adding different luminogens (1/1, molar ratio) measured in THF-water (1/4, v/v) mixtures (concentration: 5×10$^{-5}$ M. $\lambda_{ex}$=365 nm (added BPEA), 330 nm (added TPE) and 340 (added TPP-4M).
Figure 23B:
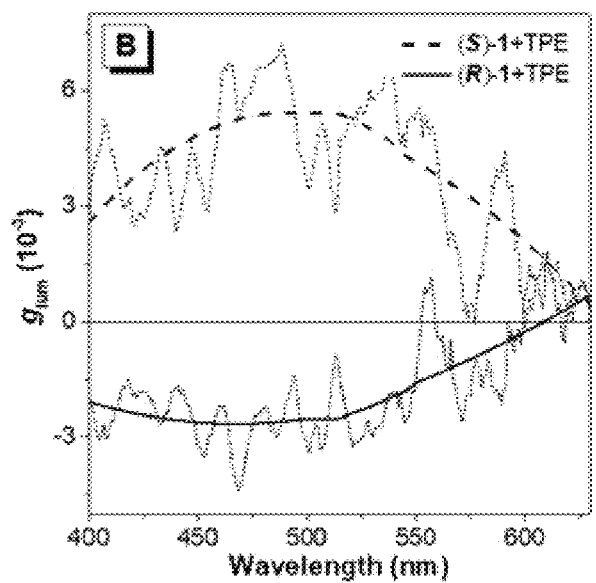
Figure 23C:
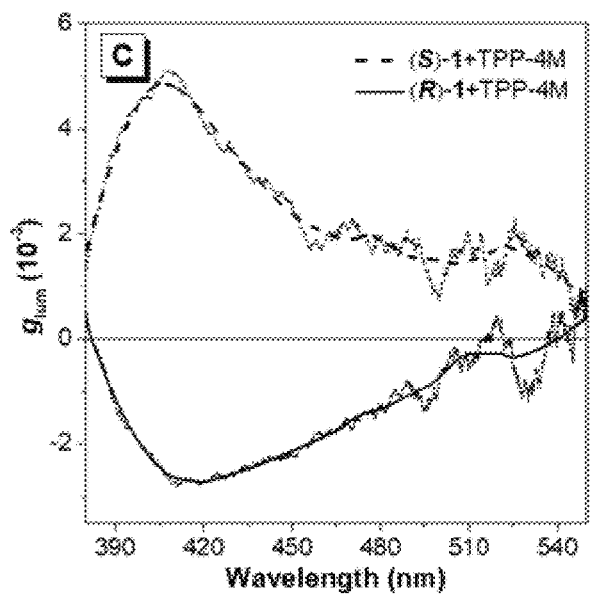

Conventional luminophores with aggregation-caused quenching (ACQ) effect were first chosen and co-assembled with chiral enantiomers (S)-1 and (R)-1 to test the co-assembly strategy. The luminogen 9,10-bis(phenylethynyl) anthracene (BPEA) was used as the achiral π-acceptor to co-assemble with the chiral Au complex. The complex (S)-1 or (R)-1 and BPEA were dissolved into a good THF solvent with a molar ratio of 1:1. Then, a 4-fold volume of water was added to the THF solution to get a homogeneous and turbid solution. The concentration of BPEA was fixed as 5×10$^{-5}$ M to guarantee the solubility of BPEA in the mixture. After storing for three days, the above solution was routinely measured with the CD spectrometer (FIGS. 21A-21B). Multiple new peaks were observed at the range of 320-550 nm for both of them, which originated from the BPEA component based on the absorption analysis, indicating successful chiral induction through the co-assembly route.

Figures 24A, 24B:
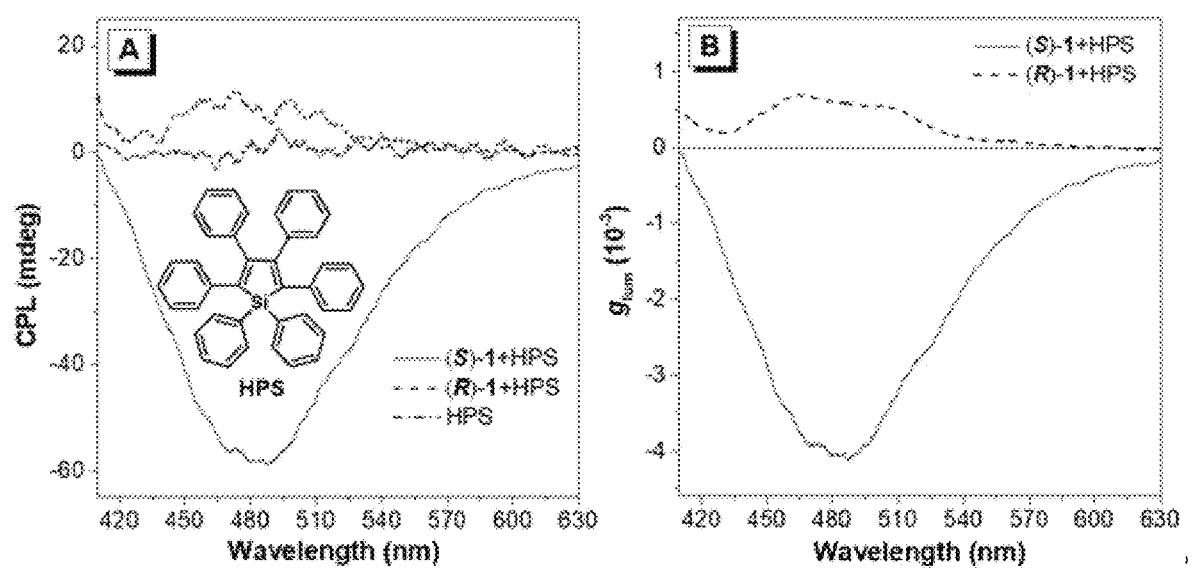
FIGS. 24(A)-24(B) depict (A) CPL spectra of (S)-1 and (R)-1 induced by HPS (1/1, molar ratio) measured in THF-water (1/4, v/v) mixtures (concentration: 5×10$^{-5}$ M. $\lambda_{ex}$=365 nm; and (B) dissymmetry factor $g_{lum}$ of (S)-1 and (R)-1 induced by HPS (1/1, molar ratio) measured in THF-water (1/4, v/v) mixtures (concentration: 5×10$^{-5}$ M. $\lambda_{ex}$=365 nm).

Another test was conducted to determine whether the co-assembly system can efficiently lead to the CPL enhancement. Strong asymmetric CPL signals centered at 560 nm for both co-assembly systems were detected with the luminescence dissymmetry factor ($|g_{lum}|$) values of 3×10$^{-3}$ and 8×10$^{-4}$, respectively, measured using a JASCO CPL-300 spectrometer (FIGS. 22A-22C), which are comparable values for conventional pure organic assembled systems. To further testify that this co-assembly strategy is not only restricted to conventional ACQgens, achiral AIEgens were co-assembled with (S)-1 and (R)-1. Three typical highly emissive AIEgens were tested in the aggregate state, tetraphenyl ethylene (TPE), 2,3,5,6-tetrakis(4-methoxyphenyl)pyrazine (TPP-4M) and hexaphenylsilole (HPS) by using similar co-assembly strategies used for BPEA. As shown in FIGS. 22A-22C and FIGS. 23A-23C, when (S)-1 and (R)-1 co-assembled with the blue luminogens TPE and TPP-4M, respectively, asymmetric but similar CPL profiles centered at 470 nm (doped with TPE) and 410 nm (doped with TPP-4M) were observed with $|g_{lum}|$ values of $5 \times 10^{-3}$ (doped with (S)-1) and $2 \times 10^{-3}$ (doped with (R)-1), respectively. For the co-assembly with HPS, inversed CPL profiles were detected and the induced signal by (R)-1 was very weak, which formed a sharp contrast to that of the much stronger signal induced by (S)-1 (FIGS. 24A-24B).

In light of the above results, this strategy can be applicable to many luminogens and the handedness and the intensity of the CPL signal could be flexibly tuned in the co-assembly systems by deliberately choosing the proper luminogens. The above template-directed CPL induction method may provide a facile and effective strategy to achieve the controllable fabrication of a variety of CPL-active materials.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:

1. A fluorescent compound exhibiting aggregation induced emission properties, the compound having the following structural formula

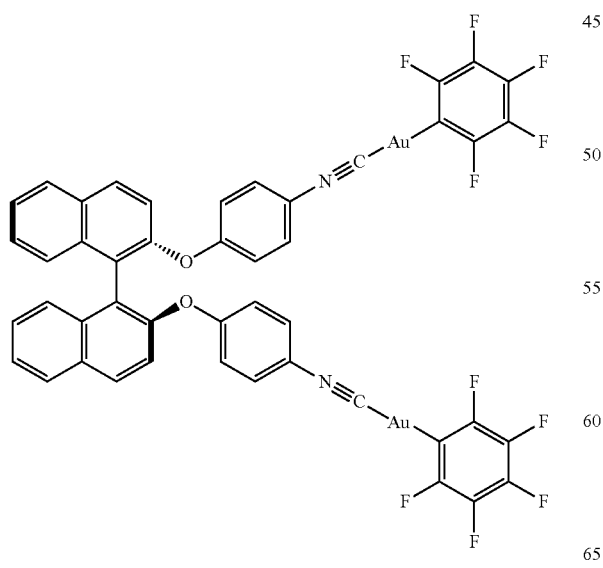

or an enantiomer thereof.

2. The compound of claim 1, wherein the compound is the enantiomer comprising the structure:

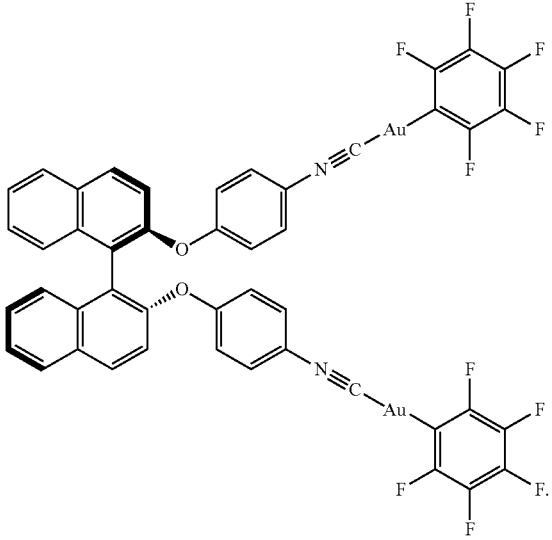

3. The compound of claim 1, wherein the compound undergoes spontaneous hierarchical self-assembly from a vesicle to a helical fiber in the aggregate state.

4. A method of monitoring the spontaneous hierarchical self-assembly of the compound of claim 3, the method comprising at least one of circular dichroism spectroscopy, scanning electron microscopy, and transmission electron microscopy.

5. A composition comprising the compound of claim 1 and at least one compound selected from the group consisting of:

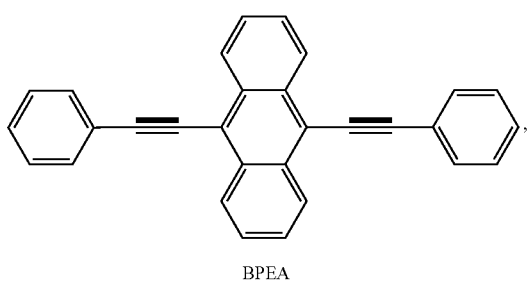

BPEA

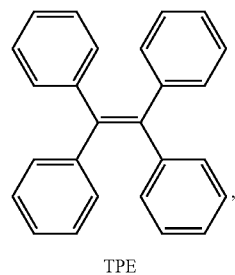

TPE

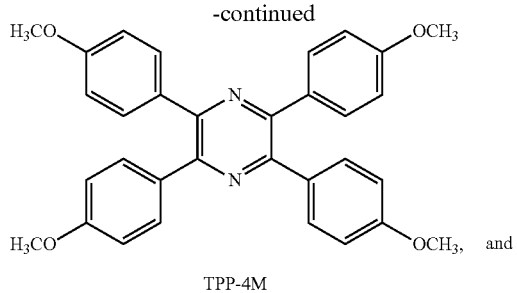

TPP-4M

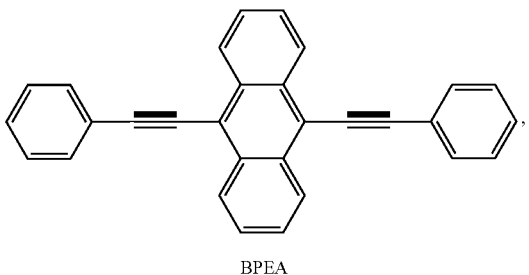

BPEA

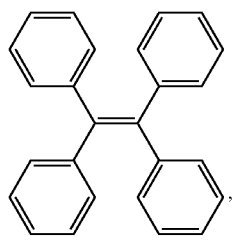

TPE

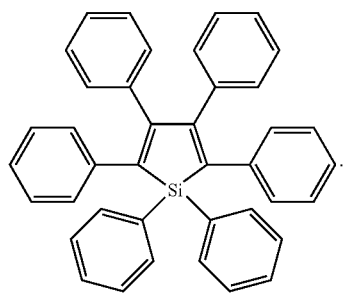

HPS

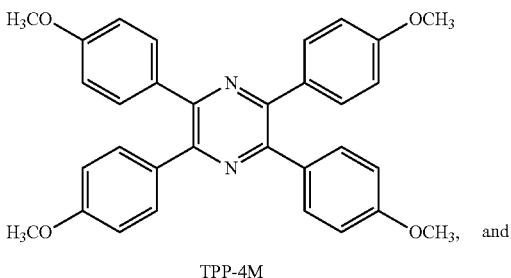

TPP-4M

6. The composition of claim 5, wherein the composition provides circularly polarized luminescence.

7. A method of synthesizing a composition capable of providing circularly polarized luminescence, comprising
providing a fluorescent compound exhibiting aggregation induced emission properties, the compound having the following structural formula

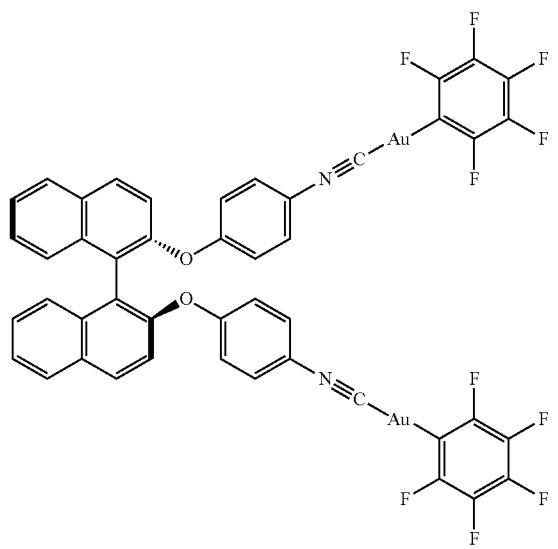

or an enantiomer thereof; and
co-assembling the fluorescent compound with at least one other compound, the at least one other compound being selected from the group consisting of

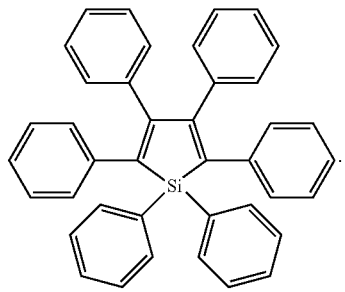

HPS

8. The method of claim 7, wherein co-assembling the fluorescent compound with the at least one other compound comprises dissolving the fluorescent compound and the at least one other compound in an aprotic solvent to provide a solution and adding water to the solution.

9. The method of claim 8, wherein the aprotic solvent is tetrahydrofuran.

10. The method of claim 7, wherein the fluorescent compound is the enantiomer comprising the structure:

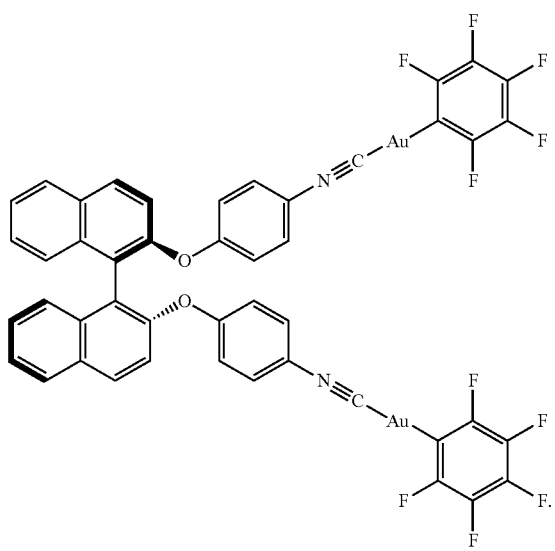

11. A composition comprising a chiral compound and at least one additional compound, wherein the composition provides circularly polarized luminescence and the chiral compound has the following structural formula

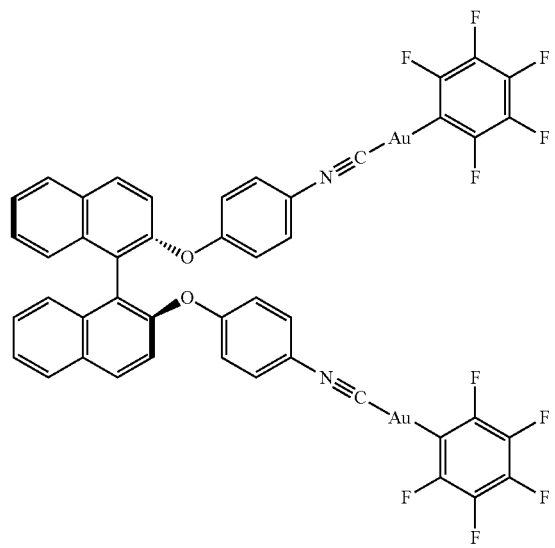

or an enantiomer thereof.

12. The composition of claim 11, wherein the chiral compound is the enantiomer comprising the structure:

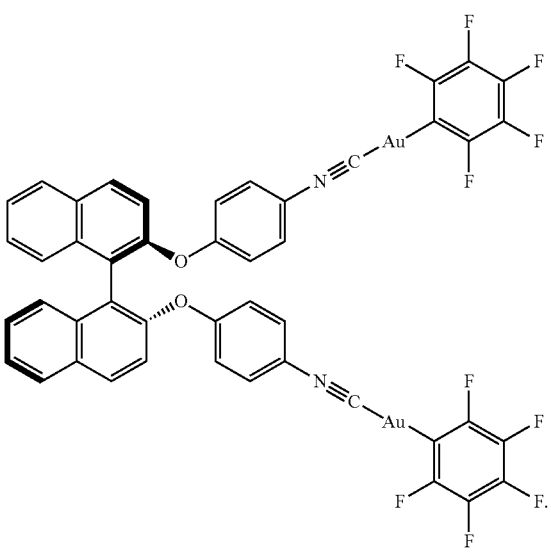

13. The composition of claim 11, wherein the at least one additional compound is selected from the group consisting of:

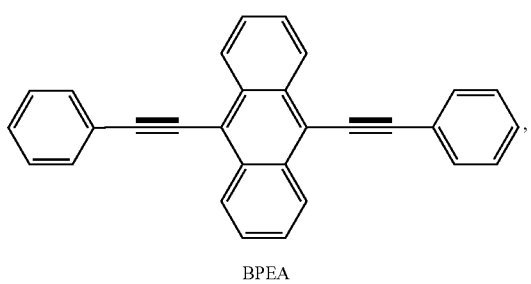

BPEA

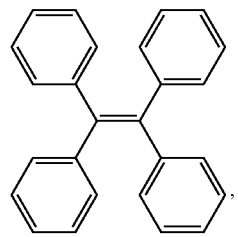

TPE

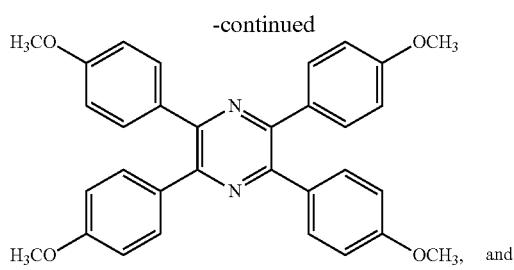
TPP-4M
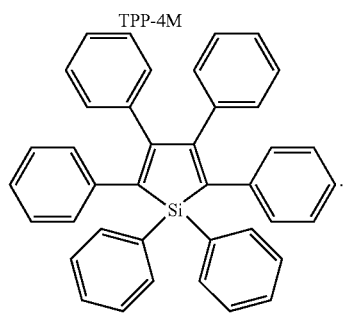
HPS
14. The method of claim 13, wherein the compound is administered in nanoparticle form.
15. The composition of claim 14, wherein the chiral compound is the enantiomer comprising the structure:
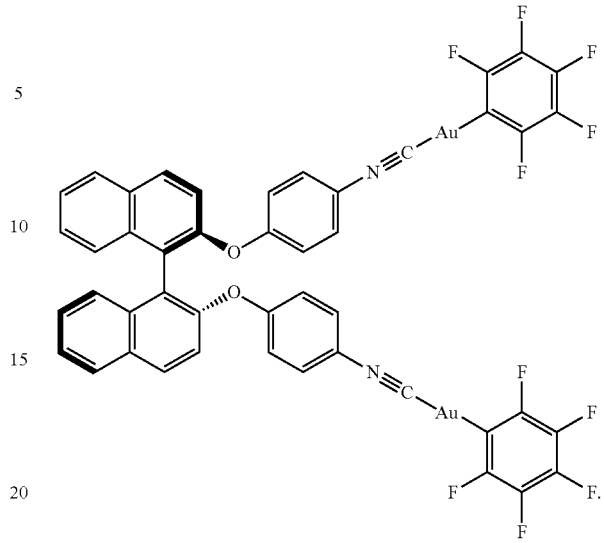
16. The composition of claim 11, wherein the chiral compound includes at least one gold atom.
* * * * *